US007860296B2

(12) United States Patent
Kwon et al.

(10) Patent No.: US 7,860,296 B2
(45) Date of Patent: Dec. 28, 2010

(54) METHOD AND SYSTEM FOR TESTING A DISPLAY PANEL ASSEMBLY

(75) Inventors: Sang-Hyuk Kwon, Seoul (KR); Kyoung-Ho Yang, Suwon-si (KR); Soon-Jae Park, Suwon-si (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 1422 days.

(21) Appl. No.: 11/272,479

(22) Filed: Nov. 10, 2005

(65) Prior Publication Data

US 2006/0120588 A1 Jun. 8, 2006

(30) Foreign Application Priority Data

Nov. 11, 2004 (KR) ...................... 10-2004-0091809

(51) Int. Cl.
*G06K 9/00* (2006.01)
*G06K 9/62* (2006.01)

(52) U.S. Cl. ...................... 382/141; 382/143; 382/149; 382/209

(58) Field of Classification Search ...................... None
See application file for complete search history.

(56) References Cited

U.S. PATENT DOCUMENTS

| | | | | |
|---|---|---|---|---|
| 4,940,934 | A * | 7/1990 | Kawaguchi et al. | 324/770 |
| 5,184,082 | A * | 2/1993 | Nelson | 324/537 |
| 5,235,272 | A * | 8/1993 | Henley | 324/770 |
| 5,256,578 | A * | 10/1993 | Corley et al. | 438/17 |
| 5,363,037 | A * | 11/1994 | Henley et al. | 324/158.1 |
| 5,850,205 | A * | 12/1998 | Blouin | 345/102 |
| 5,917,935 | A * | 6/1999 | Hawthorne et al. | 382/149 |
| 5,966,458 | A * | 10/1999 | Yukawa et al. | 382/141 |
| 6,483,937 | B1 * | 11/2002 | Samuels | 382/144 |
| 6,716,588 | B2 * | 4/2004 | Sammak et al. | 435/7.2 |
| 7,110,104 | B2 * | 9/2006 | Choi et al. | 356/237.1 |
| 7,166,856 | B2 * | 1/2007 | Cho et al. | 250/559.45 |
| 7,358,517 | B2 * | 4/2008 | Caldwell | 250/559.45 |

(Continued)

FOREIGN PATENT DOCUMENTS

JP 2000-231347 8/2000

(Continued)

OTHER PUBLICATIONS

See Machine Translation of JP 2000-321545.*

*Primary Examiner*—Vikkram Bali
*Assistant Examiner*—Michelle Entezari
(74) *Attorney, Agent, or Firm*—F. Chau & Associates, LLC

(57) ABSTRACT

A test system includes a rotatable turntable, a loading section, a first image pickup section, a second image pickup section, a system control section and an unloading section. The loading section loads a display panel assembly onto the stage. The loading section recognizes a unique number of the display panel assembly. The first image pickup section obtains an active area image data from an active area image. A valid first active area defect is detected using an active area image data obtained from an active area image displayed on the display panel assembly. An inactive area defect is detected based on an inactive area image data and a reference inactive area image data.

24 Claims, 23 Drawing Sheets

U.S. PATENT DOCUMENTS

| | | | | |
|---|---|---|---|---|
| 7,388,978 | B2 * | 6/2008 | Duvdevani et al. | 382/145 |
| 2002/0163527 | A1 * | 11/2002 | Park | 345/594 |
| 2003/0081825 | A1 * | 5/2003 | Mitterholzer | 382/141 |
| 2004/0027636 | A1 * | 2/2004 | Miles | 359/243 |
| 2006/0109391 | A1 * | 5/2006 | Huitema et al. | 349/19 |

FOREIGN PATENT DOCUMENTS

| | | |
|---|---|---|
| JP | 2000-267131 | 9/2000 |
| JP | 2000-284722 | 10/2000 |
| JP | 2000-321545 | 11/2000 |
| WO | WO 98-48403 | 10/1998 |

* cited by examiner (AIM1)

(AIM2)

(AIM3)

(IIM)

(RIM)

METHOD AND SYSTEM FOR TESTING A DISPLAY PANEL ASSEMBLY

CROSS-REFERENCE TO RELATED APPLICATION

This application claims priority to Korean Patent Application No. 2004-91809, filed on Nov. 11, 2004, the disclosure of which is herein incorporated by reference in its entirety.

BACKGROUND OF THE INVENTION

1. Field of the Invention

The present invention relates to a method and system for testing a display panel assembly. More particularly, the present invention relates to a test system for automatically performing a visual inspection process and a method of testing a display panel assembly using the test system.

2. Description of the Related Art

In general, a liquid crystal display panel includes a lower substrate, an upper substrate and a liquid crystal layer. The liquid crystal layer is disposed between the lower substrate and the upper substrate. The lower substrate includes a pixel area and a peripheral area. A drive signal can be applied to the peripheral area.

The pixel area includes a data line, a gate line and a pixel electrode. The data line extends in a first direction. The gate line extends in a second direction. The first direction is substantially perpendicular to the second direction. The pixel electrode is electrically connected to the data line and the gate line.

The peripheral area includes a first drive chip pad and a second drive chip pad. Each of the first and second drive chip pads includes a drive chip. The first drive chip pad provides a data signal. The second drive chip pad provides a gate signal.

In order to inspect for defects in liquid crystal display panels, a visual inspection process is performed. Generally, the visual inspection process is a manual operation. The labor-intensive and manual nature of the inspection process can affect yield and cost. It is possible that the defects may not be accurately detected during a manual inspection process, decreasing display quality of the display device.

SUMMARY OF THE INVENTION

Exemplary embodiments of the present invention provide a test system for automatically performing a visual inspection process and a method of testing a display panel assembly using the test system.

In accordance with an aspect of the present invention, a test system includes a rotatable turntable, a loading section, a first image pickup section, a second image pickup section, a system control section and an unloading section. The rotatable turntable includes a plurality of stages. The loading section loads a display panel assembly onto the stage. The loading section recognizes a unique number of the display panel assembly. The first image pickup section picks up an active area image displayed on the display panel assembly. The first image pickup section obtains an active area image data from the active area image. The second image pickup section picks up an inactive area image displayed on the display panel assembly. The second image pickup section obtains an inactive area image data from the inactive area image. The system control section detects a valid first active area defect using the active area image data. The system control section detects an inactive area defect using the inactive area image data. The unloading section unloads the display panel assembly from the stage.

In accordance with an exemplary embodiment of the present invention, the test system includes a loading cassette and an unloading cassette. The loading cassette receives the display panel assemblies to be loaded onto the stage. The unloading cassette receives the display panel assemblies unloaded from the stage.

In accordance with an exemplary embodiment of the present invention, the first image pickup section includes a first camera and a first signal processing section. The first camera picks up the active area image displayed on the display panel assembly. The first signal processing section converts a signal of the active area image into the active area image data.

In accordance with an exemplary embodiment of the present invention, the second image pickup section includes a second camera and a second signal processing section. The second camera picks up the inactive area image displayed on the display panel assembly. The second signal processing section converts a signal of the inactive area image into the inactive area image data.

In accordance with an exemplary embodiment of the present invention, the stage includes a backlight portion, a support member, a front light portion and a signal generating portion. The backlight portion provides a light to a first side of the display panel assembly. The support member is disposed over the backlight portion and supports the display panel assembly. The front light portion provides a light to a second side of the display panel assembly. The signal generating portion applies an electrical signal to the display panel assembly.

In accordance with an exemplary embodiment of the present invention, the system control section controls the stage to at least one of electrically drive the display panel assembly or optically drive the display panel assembly.

In accordance with an exemplary embodiment of the present invention, the system control section includes an active area defect inspecting section, an inactive area defect inspecting section and a controller. The active area defect inspecting section inspects the display panel assembly using the active area image data. The inactive area defect inspecting section inspects the display panel assembly using the inactive area image data. The controller controls the system control section, the active area defect inspecting section and the inactive area defect inspecting section.

In accordance with an exemplary embodiment of the present invention, the active area defect inspecting section includes an active area determining section, a second active area defect deleting section and a valid first defect detecting section. The active area determining section determines an X-axis projection and a Y-axis projection of the active area image data to determine an active area of the display panel assembly. The second active area defect deleting section deletes a second active area defect from active area defects of the active area image data. The valid first defect detecting section detects a valid first defect of the active area image data after the second defect is deleted from the active area image data.

In accordance with an exemplary embodiment of the present invention, when a size of the active area determined by the active area determining section is different from a size of an actual active area of the display panel assembly by a predetermined value, the controller stops operations of the active area defect inspecting section and the inactive area defect inspecting section.

In accordance with an exemplary embodiment of the present invention, when the valid defect is detected from the active area image data after the second defect is deleted from the active area image data, the controller stops an operation of the inactive area defect inspection section.

In accordance with an exemplary embodiment of the present invention, the inactive area defect inspecting section includes a reference data storing section and an inactive area defect detecting section. The reference data storing section stores a reference inactive area image data obtained from a reference display panel assembly being substantially free of the inactive area defect. The inactive area defect detecting section compares the reference inactive area image data with the inactive area image data to detect the inactive area defect.

In accordance with an exemplary embodiment of the present invention, the active area determining section determines the active area using the active area image data obtained from the active area image generated using the backlight portion in a state free of an electrical field.

In accordance with an exemplary embodiment of the present invention, the second defect deleting section deletes the second defect using a difference between a first active area image data and a second active area image data. The first active area image data is obtained from a first active area image generated using the backlight portion in a state of an electrical field. The second active area image data is obtained from a second active area image generated using the front light portion in a state substantially free of the electrical field.

In accordance with an exemplary embodiment of the present invention, the valid first active area defect detecting section determines the valid first active area defect using a pixel singularity measurement method, a binary method and a blob analysis method. The pixel singularity measurement method determines a singularity of a standard pixel using differences in a gray level between the standard pixel and neighboring pixels that neighbor with the standard pixel. The binary method converts the singularity into binary digits of "1" or "0". The blob analysis method manages pixels having an identical binary digit as a group to detect the valid first active area defect.

In accordance with an exemplary embodiment of the present invention, the singularity S(x,y) is determined as $$S(x,y)=\text{Max}[\text{Min}(G(x,y)-G(x-kn,y),G(x,y)-G(x+kn,y)),\text{Min}(G(x,y)-G(x,y-kn),G(x,y)-G(x,y+kn))],$$

wherein G(x,y) is a gray level of a pixel (x,y) and "k" and "n" are natural numbers.

In accordance with an exemplary embodiment of the present invention, the inactive area image data is obtained by the inactive area image generated using the backlight portion in a state substantially free of an electrical field.

In accordance with another aspect of the present invention, there is provided a method of testing a display panel assembly. The method includes recognizing a unique number of a display panel assembly loaded onto a stage positioned on a turntable. A valid first active area defect is detected using an active area image data obtained from an active area image displayed on the display panel assembly. An inactive area defect is detected using an inactive area image data and a reference inactive area image data. The inactive area image data is obtained from an inactive area image displayed on the display panel assembly. The display panel assembly is unloaded from the stage.

In accordance with an exemplary embodiment of the present invention, detecting the valid first active area defect includes detecting an active area of the display panel assembly using the active area image data. A second active area defect is deleted from the active area image data. A valid first active area defect of the active area image data is detected after the second active area defect is deleted from the active area image data.

In accordance with an exemplary embodiment of the present invention, detecting the valid first active area defect includes comparing the active area with an actual active area. When a size of the active area is different from a size of the actual active area by a predetermined value, an active area defect inspecting process and an inactive area defect inspecting process are stopped.

In accordance with an exemplary embodiment of the present invention, when the valid first active area defect is detected, an active area defect inspecting process and an inactive area defect inspecting process are stopped.

In accordance with an exemplary embodiment of the present invention, detecting the active area includes picking up a first active area image displayed on the display panel assembly using a backlight portion in a state substantially free of an electrical field. The first image is converted into a first active area image data. An X-axis projection and a Y-axis projection are determined using the first image data. The active area of the display panel assembly is determined using the X-axis projection and the Y-axis projection.

In accordance with an exemplary embodiment of the present invention, the second active area defect is deleted. When a test voltage is applied to the display panel assembly, a first active area image being displayed on the display panel assembly using a backlight portion is picked up. The first active area image is converted into a first active area image data. When the test voltage is not applied to the display panel assembly, a second active area image being displayed on the display assembly using a front light portion is picked up. The second active area image is converted into a second active area image data. The second active area defect is deleted by excluding the second active area image data from the first active area image data.

In accordance with an exemplary embodiment of the present invention, detecting the valid first active area defect includes determining a singularity of a standard pixel is determined using differences in a gray level between the standard pixel and neighboring pixels that neighbor with the standard pixel. The singularity is converted into binary digits of "1" or "0". Pixels having an identical binary digit are managed as a group to detect the valid first active area defect.

In accordance with an exemplary embodiment of the present invention, detecting the inactive area defect includes picking up an inactive area image displayed on the display panel assembly using a backlight portion in a state substantially free of an electrical field. The inactive area image is converted into an inactive area image data. The inactive area defect is detected based on a difference between the inactive area image data and the reference inactive area image data.

According to the present invention, a visual inspection process may be performed automatically. Thus, defects in display devices may be rapidly detected. The time required for detecting the defects is minimized with improved yield and reduced costs. Furthermore, the defects may be accurately detected so that display quality of the display device may be increased.

BRIEF DESCRIPTION OF THE DRAWINGS

The present invention will become more apparent to those of ordinary skill in the art when descriptions of exemplary embodiments thereof are read with reference to the accompanying drawings, of which.

DETAILED DESCRIPTION OF THE EXEMPLARY EMBODIMENTS

Figure 1:
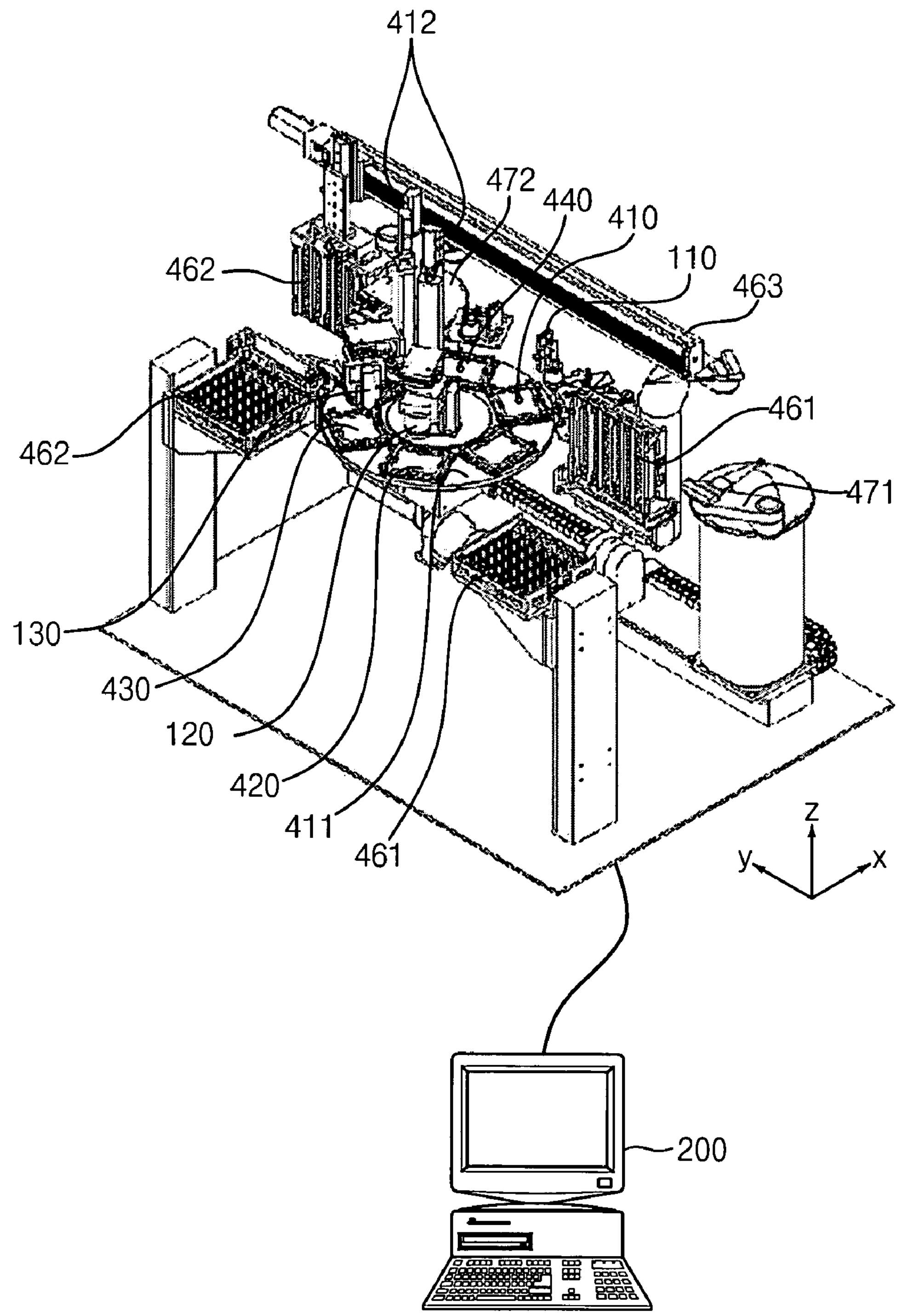
FIG. 1 is a perspective view illustrating a test system for testing a display panel assembly, according to an exemplary embodiment of the present invention.

Hereinafter, the exemplary embodiments of the present invention will be described in detail with reference to the accompanying drawings. In the drawings, the size and relative sizes of layers and regions may be exaggerated for clarity. It will be understood that when an element or layer is referred to as being "on" or "connected to" another element or layer, it can be directly on or directly connected to the other element or layer or intervening elements or layers may be present. Like reference numerals refer to similar or identical elements throughout the description of the figures.

It will be understood that, although the terms first, second, etc. may be used herein to describe various elements, components or layers, these elements, components or layers should not be limited by these terms. These terms are only used to distinguish one element, component or layer from another element, component or layer. Thus, a first element, component or layer could be termed a second element, component or layer.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures.

FIG. 1 is a perspective view illustrating a test system for testing a display panel assembly, according to an exemplary embodiment of the present invention. The display panel assembly may include a display panel and a printed circuit board (PCB) electrically connected to the display panel. The display panel includes pixels, data lines, gate lines and one or more optical films. The display panel includes an active area on which an image can be displayed.

A defect positioned within the active area is referred as an active area defect. A defect positioned outside the active area is referred as an inactive area defect. An active area defect may cause the display quality of the display panel assembly to be deteriorated.

Referring to FIG. 1, a test system includes an optical character recognition (OCR) section 110, an active area image pickup section 120, an inactive area image pickup section 130, an instrument section and a system control section 200.

The OCR section 110 recognizes a unique number of a display panel assembly loaded in the test system. The system control section 200 is provided with the unique number recognized by the OCR section 110. The system control section 200 uses the unique number to manage inspection results of an inspection process.

The active area image pickup section 120 picks up an active area image data that is electrically and optically displayed on the display panel assembly. The active area image pickup section 120 then provides the system control section 200 with the active area image data.

The inactive area image pickup section 130 picks up an inactive area image data optically displayed on the display panel assembly. The inactive area image pickup section 130 then provides the system control section 200 with the inactive area image data.

The instrument section includes a rotatable turntable 411, a plurality of stages, a camera carrier 412, a loading cassette 461, an unloading cassette 462, a cassette carrier 463, a loading arm 471 and an unloading arm 472. The system control section 200 controls the instrument section.

The stages are positioned on the turntable 411. The display panel assemblies are received in the stages. The turntable 411 sequentially carries the display panel assembly received in the stage to the OCR section 110 and to either the active area image pickup section 120 or the inactive area image pickup section 130.

The camera carrier 412 carries a first camera of the active area image pickup section 120 and a second camera of the inactive area image pickup section 130 in a positive Z-axis direction or a negative Z-axis direction in accordance with a size of the display panel assembly. When the size of the display panel assembly is relatively small, the camera carrier 412 carries the first and second cameras in the positive Z-axis direction. When the size of the display panel assembly is relatively large, the camera carrier 412 carries the first and second cameras in the negative Z-axis direction. As a result, a desired focal distance may be efficiently obtained.

The display panel assemblies are received in the loading cassette 461 before an automatic visual inspection process. As illustrated in FIG. 1, the loading cassette 461 stands in the positive Z-axis direction during the automatic visual inspection process.

The display panel assemblies are received in the unloading cassette 462 after the automatic visual inspection process. As illustrated in FIG. 1, the unloading cassette 462 stands in the positive Z-axis direction during the automatic visual inspection process. When the display panel assemblies are received in the unloading cassette 462 after the automatic visual inspection, the unloading cassette lies in a negative X-axis direction.

When the loading cassette 461 is empty, the cassette carrier 463 carries the loading cassette 461 to an unloading position. Thus, the loading cassette 461 is used as the unloading cassette 462 receiving the display panel assemblies after the automatic visual inspection.

The loading arm 471 removes the display panel assembly from the loading cassette 461. The loading arm 471 then carries the display panel assembly from the loading cassette 461 to the stage positioned at a first portion of the turntable 411. The first portion is positioned under the OCR section 110. In accordance with an embodiment of the present invention, the OCR section is a starting point of the automatic visual inspection process.

After the automatic visual inspection process is finished, the unloading arm 472 removes the display panel assembly from the fourth state 440 into the unloading cassette 462. The system control section 200 controls the operation of the test system. The system control section 200 inspects for the active area defect of the pixels, the gate lines, the data lines and the optical film of the display panel using the active area image data provided from the active area image pickup section 120.

The system control section 200 inspects for the inactive area defect of the PCB using the inactive area image data provided from the inactive area image pickup section 130.

Figure 2:
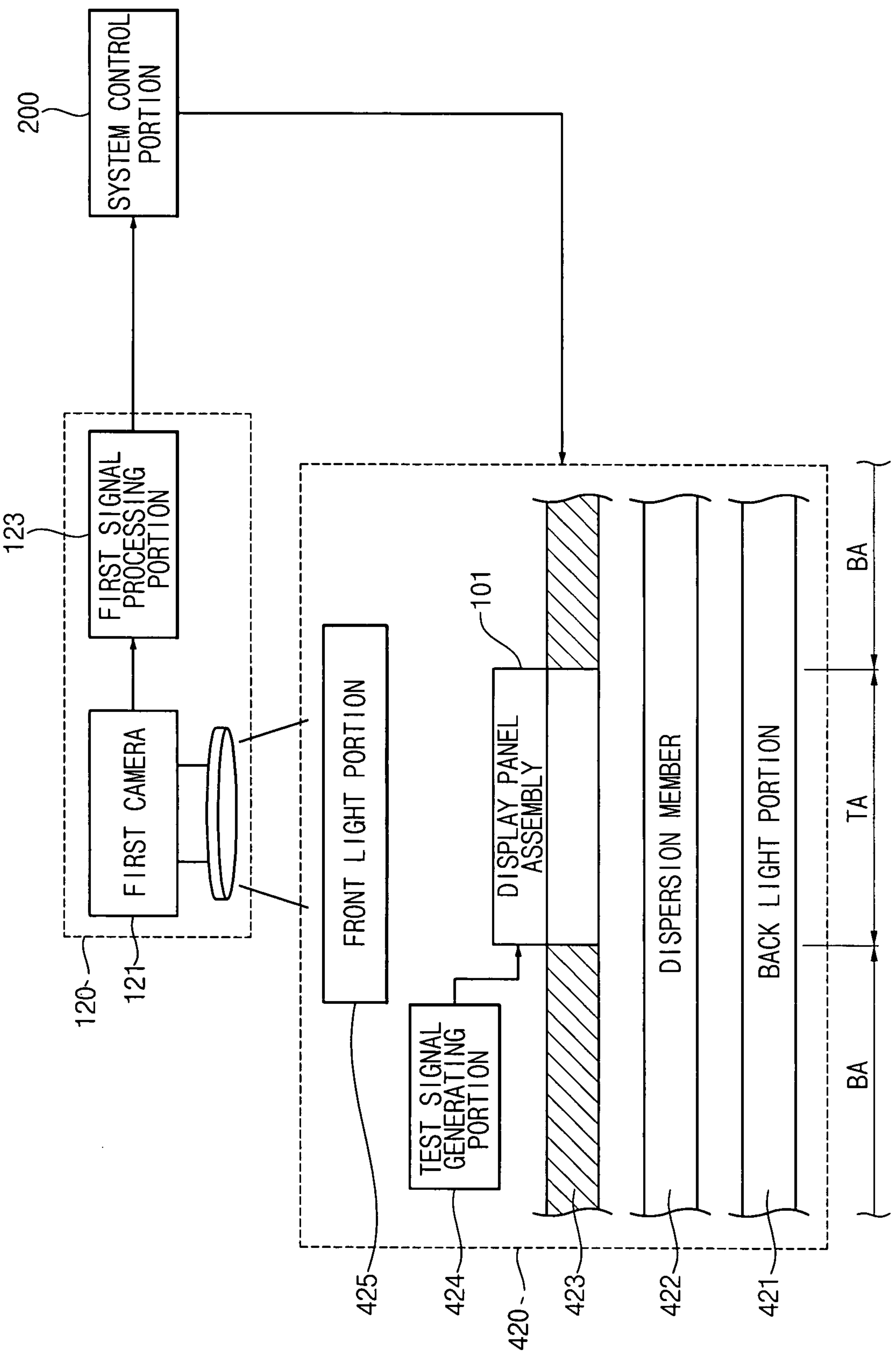
FIG. 2 is a conceptual view illustrating an operation of the active area image pickup section of FIG. 1.

FIG. 2 is a conceptual view illustrating an operation of the active area image pickup section of FIG. 1. Referring to FIG. 2, the active area image pickup section 120 includes a first camera 121 and a first signal processing section 123. The first camera 121 picks up an active area image displayed on the display panel assembly 101. The first signal processing section 123 converts a signal of the active area image into the active area image data of a frame unit. The first signal processing section 123 then provides the system control section 200 with the active area signal image data.

The active area image pickup section 120 picks up the active area image displayed on the display panel assembly 101, which is received in the stage positioned at a second portion 420 of the turntable 411, to obtain the active area image data. The active area image displayed on the display panel assembly 101 may be electrically and optically generated under the control of the system control section 200. Alternatively, the active area image displayed on the display panel assembly 101 may be optically generated under the control of the system control section 200.

The stage positioned at the second portion 420 of the turntable 411 includes a backlight portion 421, a dispersion member 422, a jig 423, a test signal generating section 424 and a front light portion 425. The backlight portion 421 provides a light to a first side of the display panel assembly 101. The dispersion member 422 disperses the light irradiated from the backlight portion 421. The jig 423 supports the display panel assembly 101. The jig 423 may be divided into a transmittance area TA and a block area BA. The transmittance area TA may transmit the light from the backlight portion. The block area BA does not transmit the light from the backlight portion. The display panel assembly 101 is positioned on the transmittance area TA so that the light may be selectively incident on the first side of the display panel assembly 101.

The test signal generating section 424 generates test signals used for testing an electrical operation of the display panel assembly 101. The test signals may be a data signal applied to a data line of the display panel assembly 101 and a gate signal applied to a gate line of the display panel assembly 101. The data signals may be a black image data, a white image data, a red image data, a green image data, a blue image data and a gray image data.

The front light portion 425 provides a light to the display panel 101. The front light portion 425 may correspond to an edge of the display panel 101. The front light portion 425 may include at least one printed circuit board having light emitting diodes. The printed circuit board may have a rectangular shape. The front light portion 425 provides light to the second side of the display panel 101, the front light having an incident angle with respect to the display panel 101.

The second stage 420 may electrically and optically drive the display panel assembly 101. Thus, the display panel assembly 101 may display the active area image used for detecting the active area defect in the pixels, the gate lines, the data lines and the optical film of the display panel.

Figure 3:
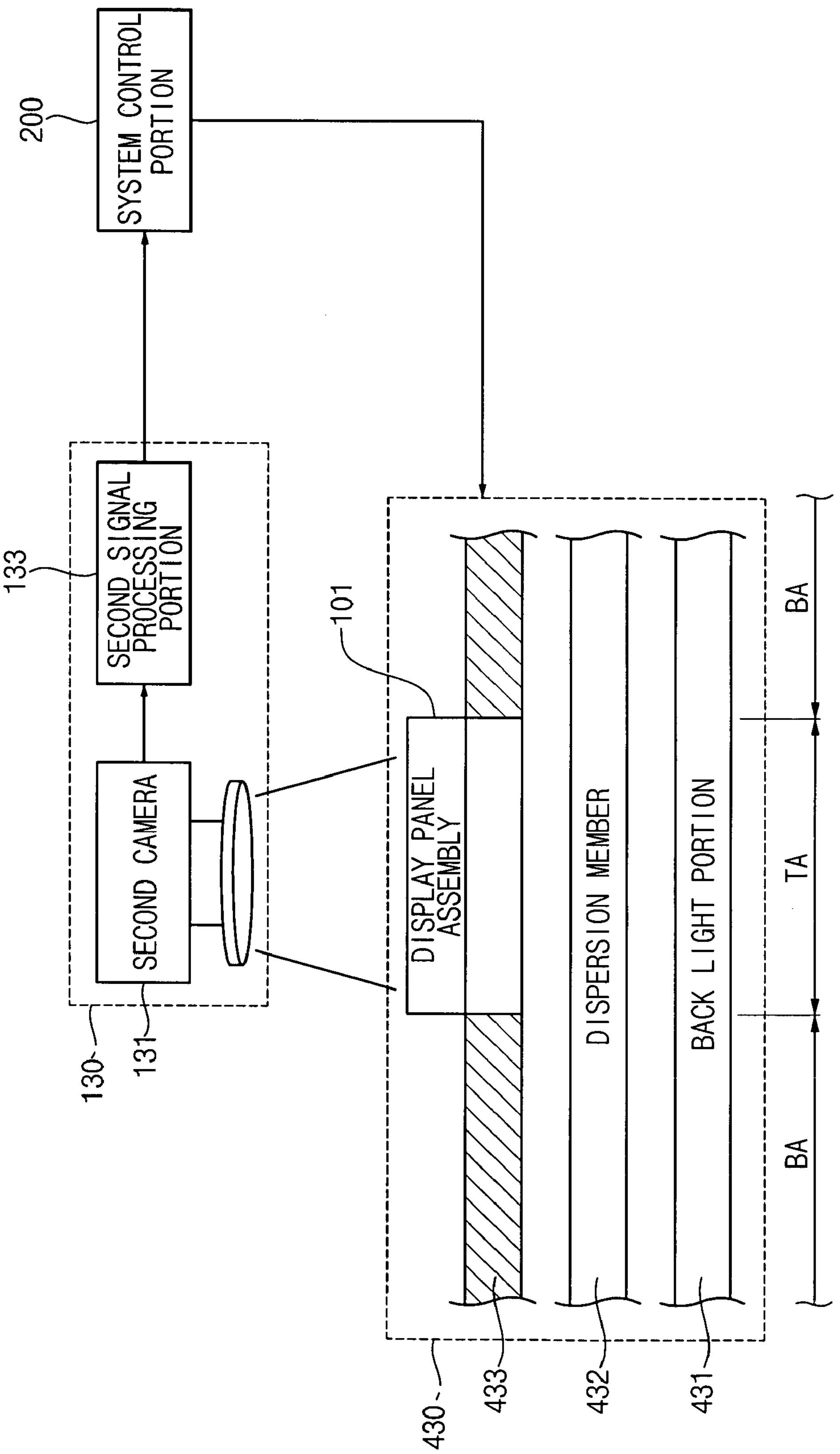
FIG. 3 is a block diagram illustrating an operation of the inactive area image pickup section of FIG. 1.

FIG. 3 is a block diagram illustrating an operation of the inactive area image pickup section of FIG. 1. Referring to FIG. 3, the inactive area image pickup section 130 includes a second camera 131 and a second signal processing section 133. The second camera 131 picks up an inactive area image displayed on the display panel assembly 101. The second signal processing section 133 converts a signal of the inactive area image into an inactive area image data of a frame unit. The second signal processing section 133 then provides the system control section 200 with the inactive area signal image data.

The inactive area image pickup section 130 picks up the inactive area image displayed on the display panel assembly 101, the display panel assembly 101 received in the stage positioned at a third portion 430 of the turntable 411, to obtain the inactive area image data. The inactive area image displayed on the display panel assembly 101 may be optically generated under the control of the system control section 200.

The stage positioned at the third portion of the turntable 411 includes a backlight portion 431, a dispersion member 432 and a jig 433. The backlight portion 431 provides a light to a first side of the display panel assembly 101. The dispersion member 432 disperses the light irradiated from the backlight portion 431. The jig 433 supports the display panel assembly 101. The jig 433 may be divided into a transmittance area TA and a block area BA. The transmittance area TA may transmit the light from the backlight portion 431. The block area BA does not transmit the light from the backlight portion 431. The display panel assembly 101 is positioned on the transmittance area TA so that the light may be selectively incident on the first side of the display panel assembly 101.

The stage positioned at the third portion of the turntable 411 may optically operate the display panel assembly 101. Thus, the display panel assembly 101 may display the inactive area image used for detecting the inactive area defect.

Although it is not shown in FIG. 3, the stage positioned at the third portion 430 of the turntable 411 may include a front light portion and a test signal generating section. The front light portion and the test signal generating section may be substantially identical to those illustrated in FIG. 2, and further explanation thereof will be omitted.

Figure 4:
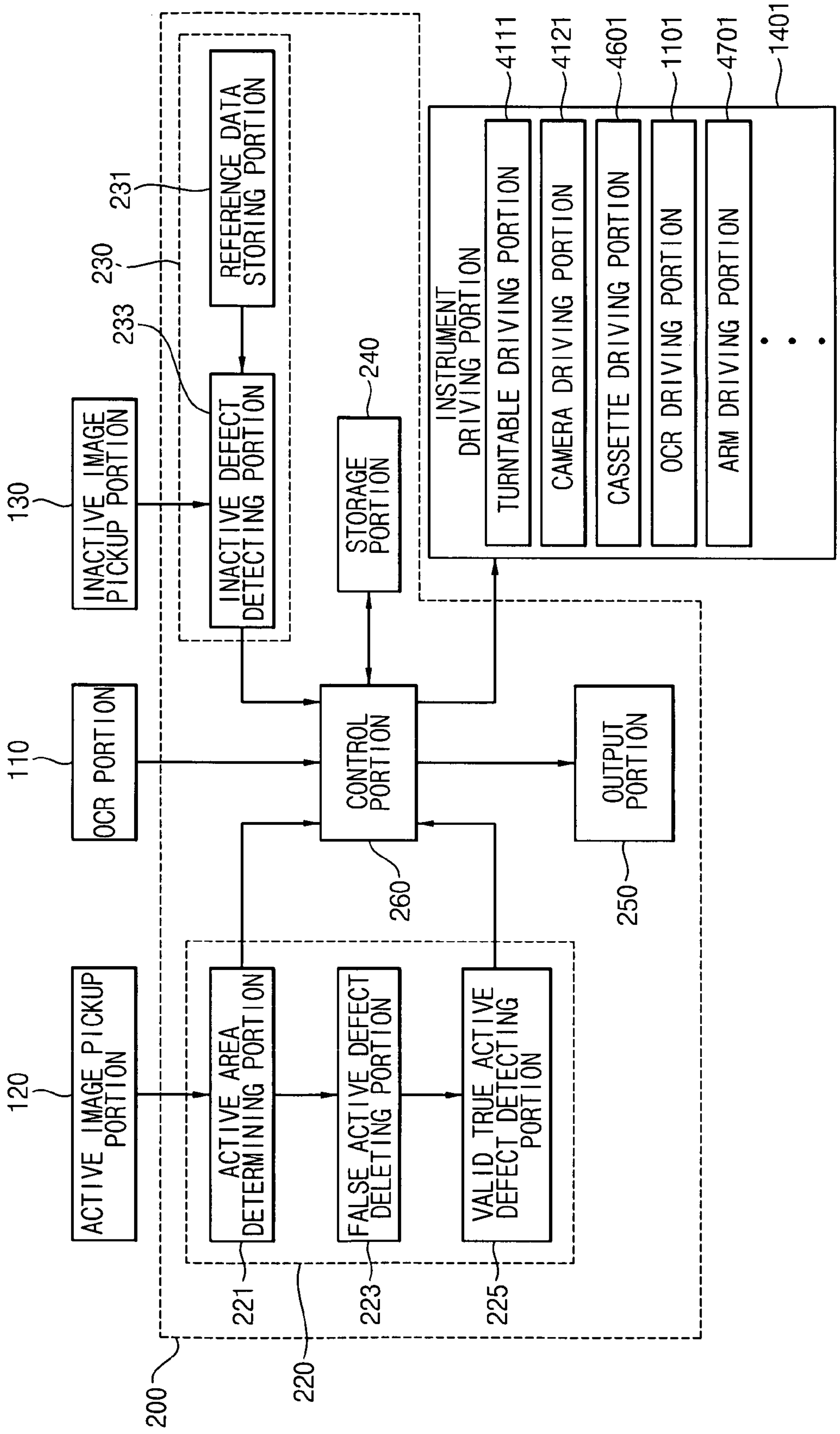
FIG. 4 is a block diagram illustrating the system control section of FIGS. 2 and 3.

FIG. 4 is a block diagram illustrating the system control section of FIGS. 2 and 3. Referring to FIG. 4, the system control section 200 includes an active area defect inspecting section 220, an inactive area defect inspecting section 230, a storage section 240, an output section 250 and a control section 260.

The active area defect inspecting section 220 generates a defect data using the active area image data provided from the active area image pickup section 120. The defect data relates to a first active area defect of a pixel, gate line, data line, and the optical film. For example, the defect data relates to a position of the first active area defect.

The active area defect inspecting section 220 includes an active area determining section 221, a second active area defect deleting section 223 and a valid first active area defect detecting section 225.

The active area determining section 221 determines the active area of the display panel assembly 101 using an X-axis projection and a Y-axis projection of the active area image data. The active area may correspond to the display panel of the display panel assembly 101. The second active area defect deleting section 223 detects second active area defects in the active area. The second active area defect deleting section 223 then deletes the second active area defects from the active area defects.

Referring to FIG. 2, active area defects 20 may be divided into second active area defects 50 and first active area defects 40. The second active area defect 50 is due to external factors. For example, the second active area defect 50 can be related to particles and/or scratches on the optical film. Remaining active area defects are referred to as the first active area defects. The first active area defects may be divided into valid first active area defects and invalid first active area defects.

The valid first active area defect detecting section 225 detects the valid first active area defects using various image processing methods. For example, the valid first active area defect detecting section 225 detects a position of the valid first active area defect. The image processing methods are a pixel singularity measurement (PSM) method, a binary method and a blob analysis method. The PSM method may determine a singularity S of a standard pixel using differences in a gray level between the standard pixel and neighboring pixels that neighbor with the standard pixel. The PSM method may then convert the first image data into a PSM image data. The binary method determines an error pixel by converting the PSM image data into the binary digits "1" and "0". The blob analysis method manages error pixels as a group, the error pixels having an identical binary digit. Thus, the valid first active area defect may be detected. The group of binary digits may correspond to the valid first defect.

Using the PSM method, a singularity S of a pixel can be determined as $$S(x,y)=\mathrm{Max}[\mathrm{Min}(G(x,y)-G(x-kn,y),G(x,y)-G(x+kn,y)),\mathrm{Min}(G(x,y)-G(x,y-kn),G(x,y)-G(x,y+kn))],$$

where G(x,y) is a gray level of a pixel (x,y) and "k" and "n" are natural numbers.

A binary digit can be obtained by comparing a threshold with the singularity S. The binary digit can be determined in one embodiment of the invention as $B(x,y)=1$ if $S(x,y)\geqq\mathrm{Threshold}$ $0$ if $S(x,y)<\mathrm{Threshold}$.

The blob analysis method manages the error pixels having the binary digit of 1 as a group.

The valid first active area defect detecting section 225 detects the valid first active area defect using the PSM method, the binary method and the blob analysis method. In particular, the first active area defect detecting section 225 detects positions of the valid first active area defects.

The inactive area defect inspecting section 230 obtains a defect information data concerning the inactive area defect using the inactive area image data provided from the inactive area image pickup section 130. The inactive area defect inspecting section 230 includes a reference inactive area image data storing section 231 and an inactive area defect detecting section 233. The inactive area defect detecting section 233 detects the inactive area defect by comparing a reference inactive area image data stored in the reference data storing section 231 with the second image data.

The unique number of the display panel assembly 101 and the inspection results associated with the unique number are stored in the storage section 240. Since the unique number and the inspection results are stored together in the storage section 240, the control section 260 may efficiently manage the inspection results.

The output section 250 may be a user interface such as a display device. The output section 250 provides the user with an image concerning the inspection result and an inspection procedure. The test system may include an input portion such as a keyboard and a mouse (not shown). The user may input a command to drive the test system using the input portion.

The control section 260 controls an operation of the system control section 200. The control section 260 controls an operation of the instrument driving section 1401 of the test system. The instrument driving section 1401 includes a rotatable driving section 4111, a camera driving section 4121, a cassette driving section 4601, an OCR driving section 1101 and an arm driving section 4701. The rotatable driving section 4111 drives the rotatable turntable 411. The camera driving section 4121 moves the camera 412. The cassette driving section 4601 moves the loading cassette 461 and the unloading cassette 462. The OCR driving section 1101 moves the OCR section 110. The arm driving section 4701 moves the loading arm 471 and the unloading arm 472.

Figure 5A:
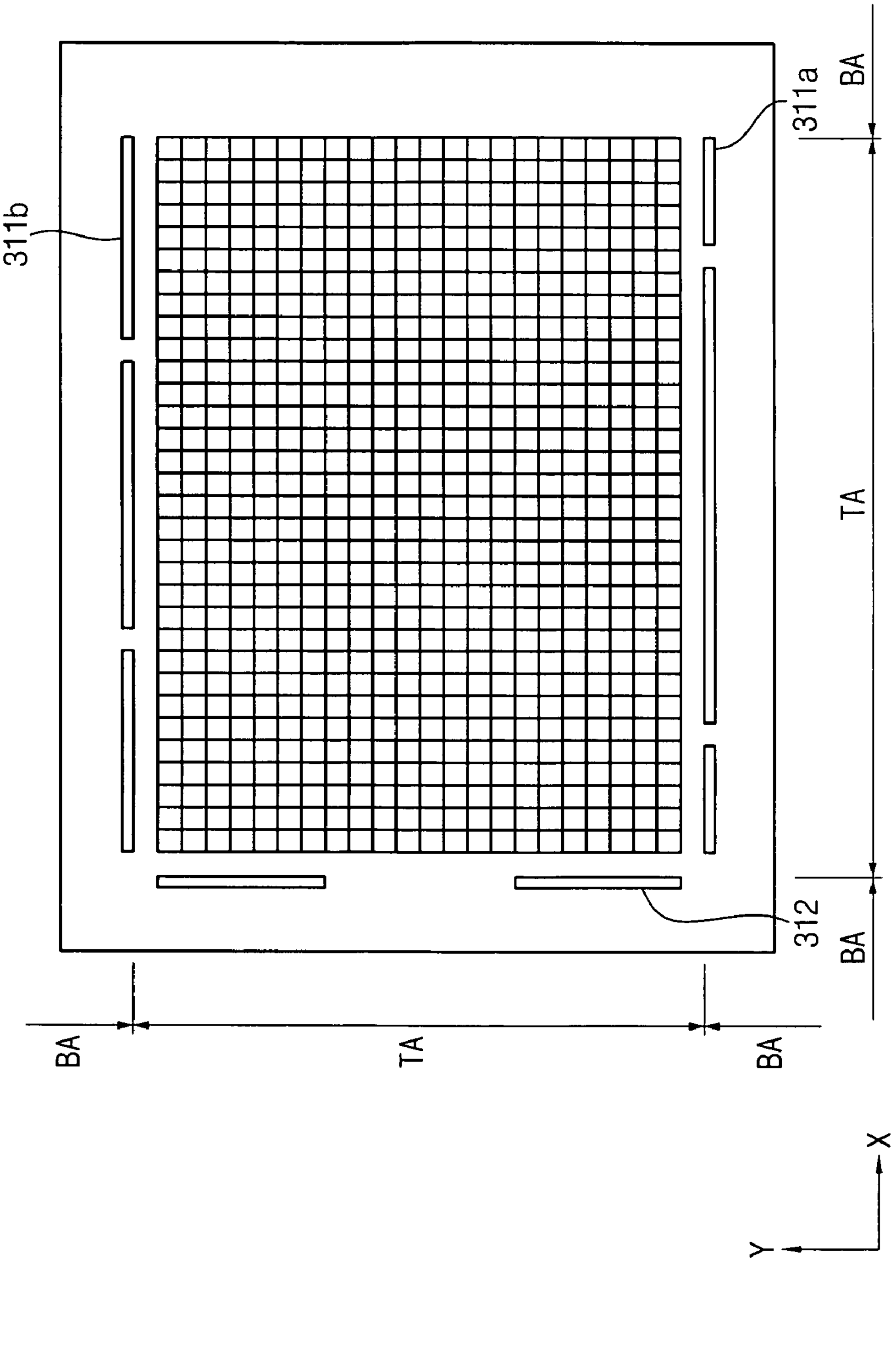
FIGS. 5A to 5C are conceptual views illustrating an operation of the active area determining section of FIG. 4.
Figure 5B:
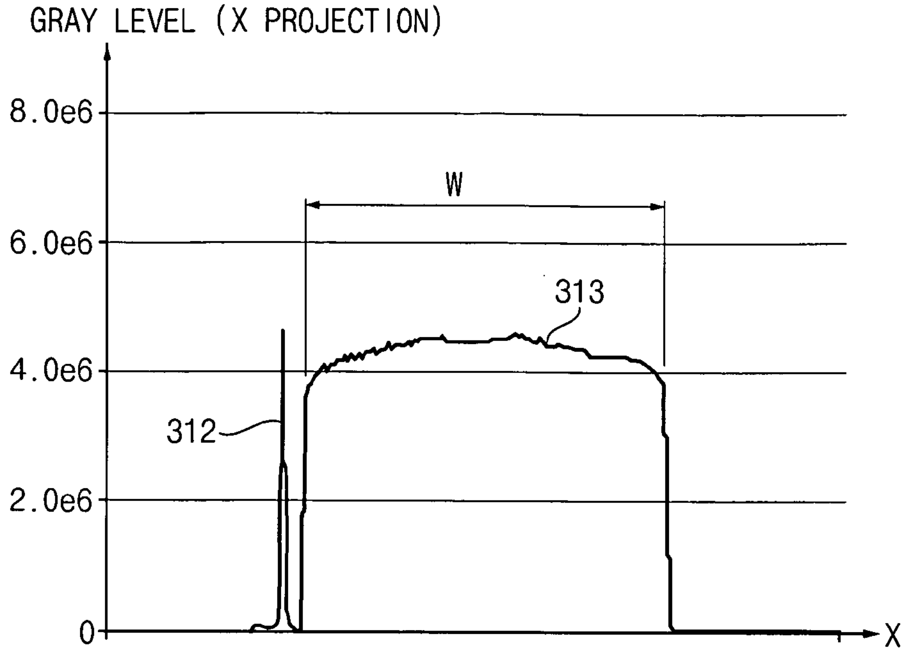
Figure 5C:
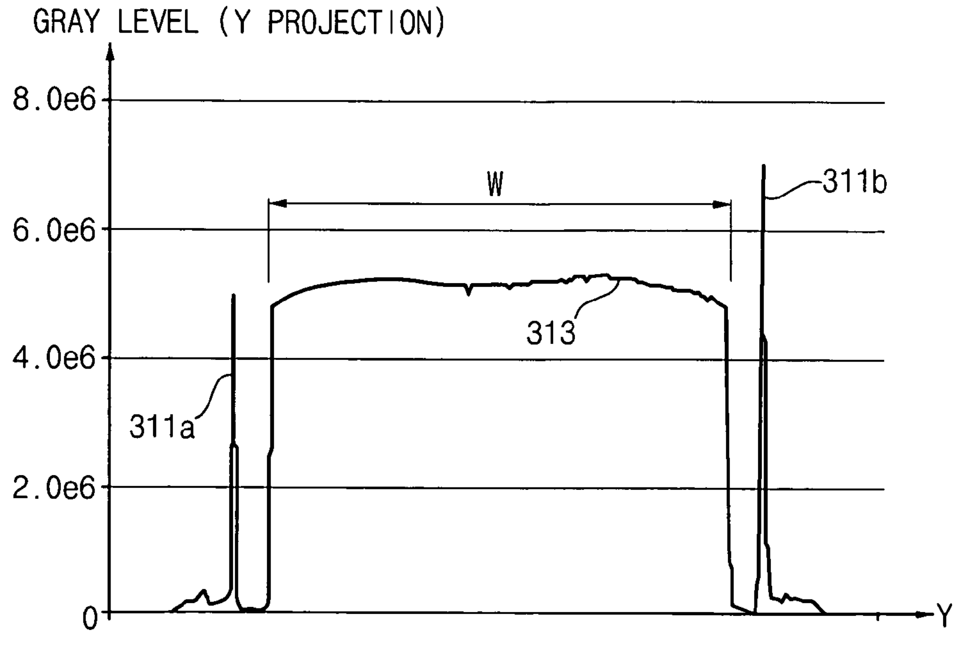

FIGS. 5A to 5C are conceptual views illustrating an operation of the active area determining section of FIG. 4. FIG. 5A is a view illustrating the active area image data provided from the active area image pickup section 120. The active area image data will be described with reference to FIGS. 2 to 5C.

The system control section 200 drives only the backlight portion 421 of the stage positioned at the second portion 420 of the test system. The first camera 121 picks up the active area image displayed on the display panel assembly 101 while the backlight portion 421 is turned on. The first signal processing section 123 converts a signal of the active area image into the active area image data in FIG. 5A. The first signal processing section 123 then provides the system control section 200 with the active area image data.

FIG. 5B is a graph illustrating an X-axis projection of the first image data in FIG. 5A. FIG. 5C is a graph illustrating a Y-axis projection of the first image data in FIG. 5A. The X-axis projections are gray levels of pixels that are arranged in an X-axis direction. The Y-axis projections are gray levels of pixels that are arranged in a Y-axis direction.

Referring to 5B, the X-axis projection of the block area BA of the stage positioned at the second portion 420 of the test system is about zero. The X-axis projection of the transmittance area TA of the stage positioned at the second portion 420 of the test system is substantially larger than zero.

A light leakage is generated between the block area BA and the transmittance area TA so that a first peak 312 of the gray level is generated. A second peak 313 is generated within the active area of the display panel assembly so that a width W of the second peak may be an X-axis length of the active area of the display panel assembly. The gray level of the second peak 313 may be over zero. In addition, the gray level of the second peak 313 may be constantly maintained within the active area.

Referring to 5C, light leakages are generated between the block area BA and the transmittance area TA so that a first peak 311*a* and a second peak 311*b* of the gray level are generated. A third peak 314 is generated within the active area of the display panel assembly so that a width W of the third peak 314 may be a Y-axis length of the active area of the display panel assembly. The gray level of the third peak 314 may be greater than zero. The gray level of the third peak 314 may be constantly maintained within the active area. The third peak 314 is positioned between the first peak 311*a* and the second peak 311*b*.

The control section 260 determines whether the X-axis and Y-axis lengths of the active area of the display panel assembly are substantially identical to a model size. When the X-axis and Y-axis lengths are different from the model size, the control section 260 outputs information about a size difference as an image data on the output section 250. The automatic visual inspection process is then stopped. That is, an active area defect inspecting process and an inactive area defect inspecting process are stopped.

Figure 6A:
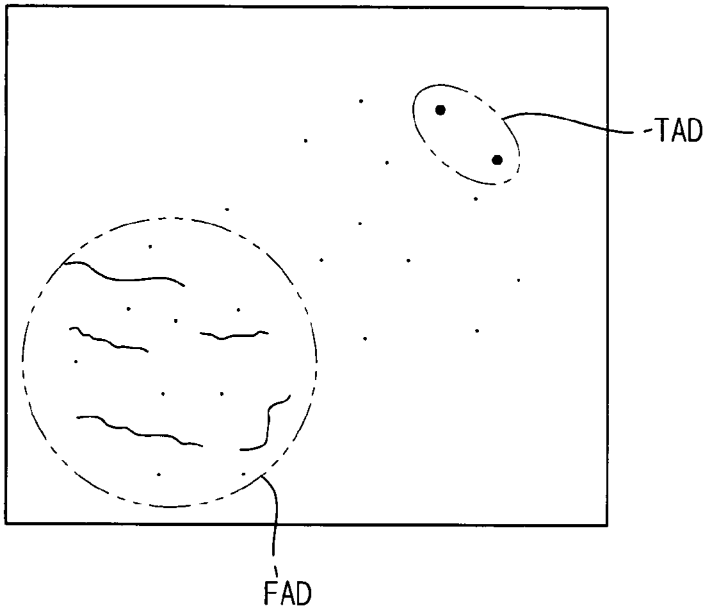
FIGS. 6A to 6D are conceptual views illustrating an operation of the second active defect deleting section of FIG. 4.

FIGS. 6A to 6D are conceptual views illustrating an operation of the second active area defect deleting section in FIG. 4. The operation of the second active area defect deleting section will be described with reference to FIGS. 2 to 6D. FIG. 6A is a view illustrating a first active area image data. The backlight portion 421 is turned on. The test signal generating section 424 provides the display panel assembly 101 with the test signal. The active area image pickup section 120 then picks up the first active area image data AIM1 from a first active area image displayed on the display panel assembly 101. As illustrated in FIG. 6A, the first active area image data AIM1 shows both the first active area defect TAD and a second active area defect FAD.

Figure 6B:
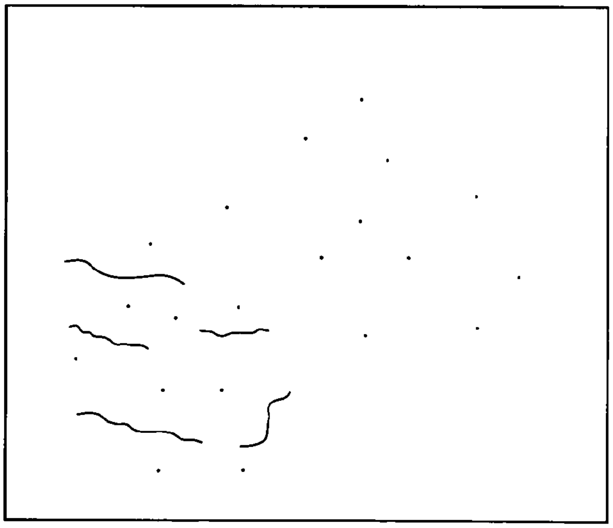

FIG. 6B is a view illustrating a second active area image data. In order to obtain the second active area image data, the backlight portion 421 is turned off, and the front light portion 425 is turned on. The active area image pickup section 120 then picks up the second active area image data AIM2 from a second image displayed on the display panel assembly 101.

Figure 6C:
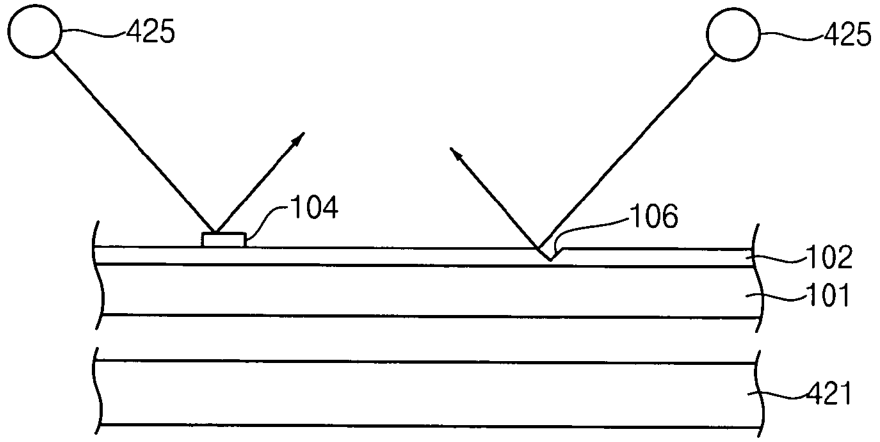
Figure 6D:
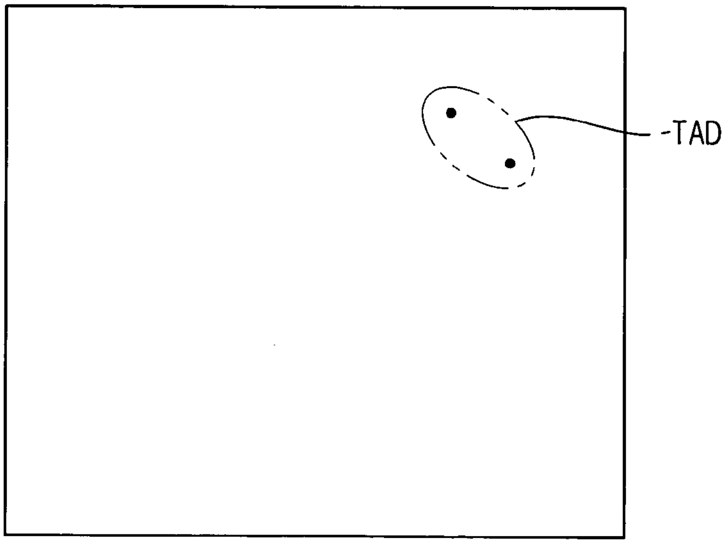

Because an electrical field may not be applied to the display panel assembly 101, the second active area image data AIM2 may not show the first active area defect TAD. As illustrated in FIG. 6C, the front light portion 425 provides light to the display panel assembly 101 so that the active area image pickup section 120 may obtain the second active area image data AIM2 associated with the second active area defect FAD such as a particle 104 and a scratch 106 that are formed at the optical film 102. The second active area image data AIM2 of FIG. 6B only shows the second active area defect FAD.

Accordingly, a third active area image data AIM3 associated with the first active area defect TAD may be obtained by deleting the second image data AIM2 of FIG. 6B from the first active area image data AIM1 of FIG. 6A.

The second active area defect deleting section 223 deletes the second active area defect FAD from the first active area image data AIM1 to obtain the third active area image data AIM3 concerning the first active area defect TAD alone. The second active area defect deleting section 223 then provides the valid first active area defect detecting section 225 with the third active area image data AIM3.

Figure 7A:
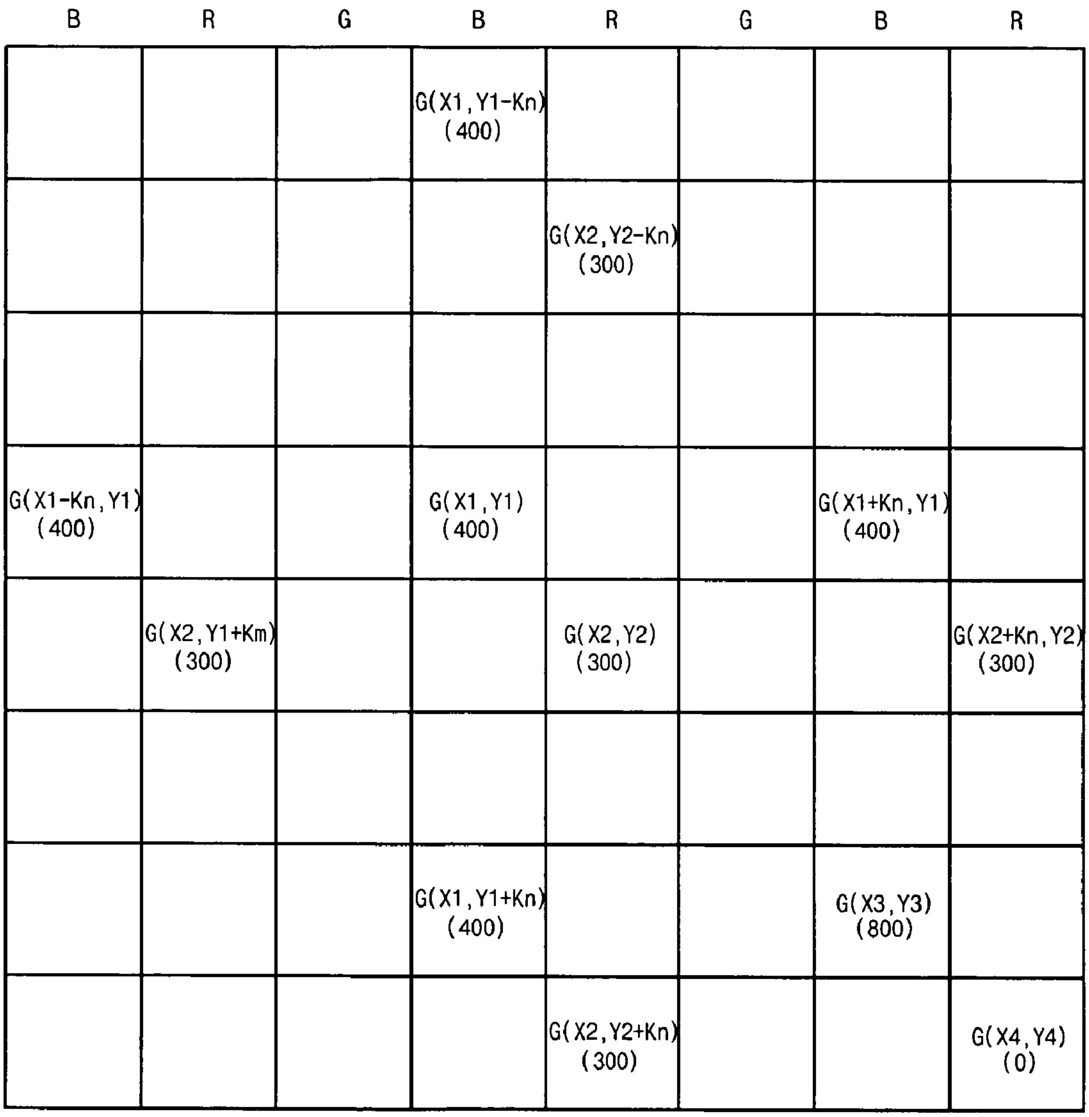
FIGS. 7A to 7D are conceptual views illustrating an operation of the valid first active defect detecting section of FIG. 4.
Figure 7B:
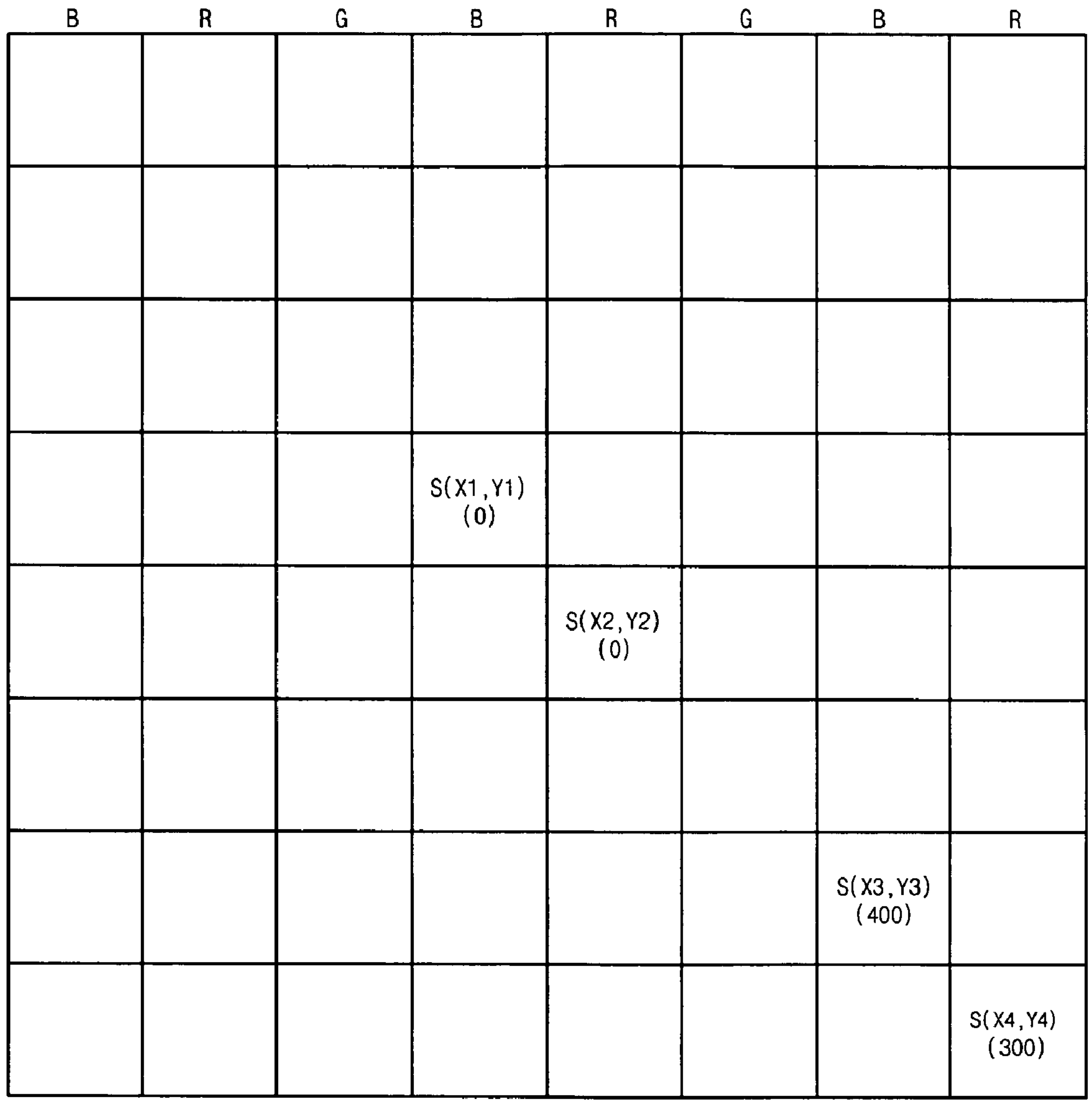
Figure 7C:
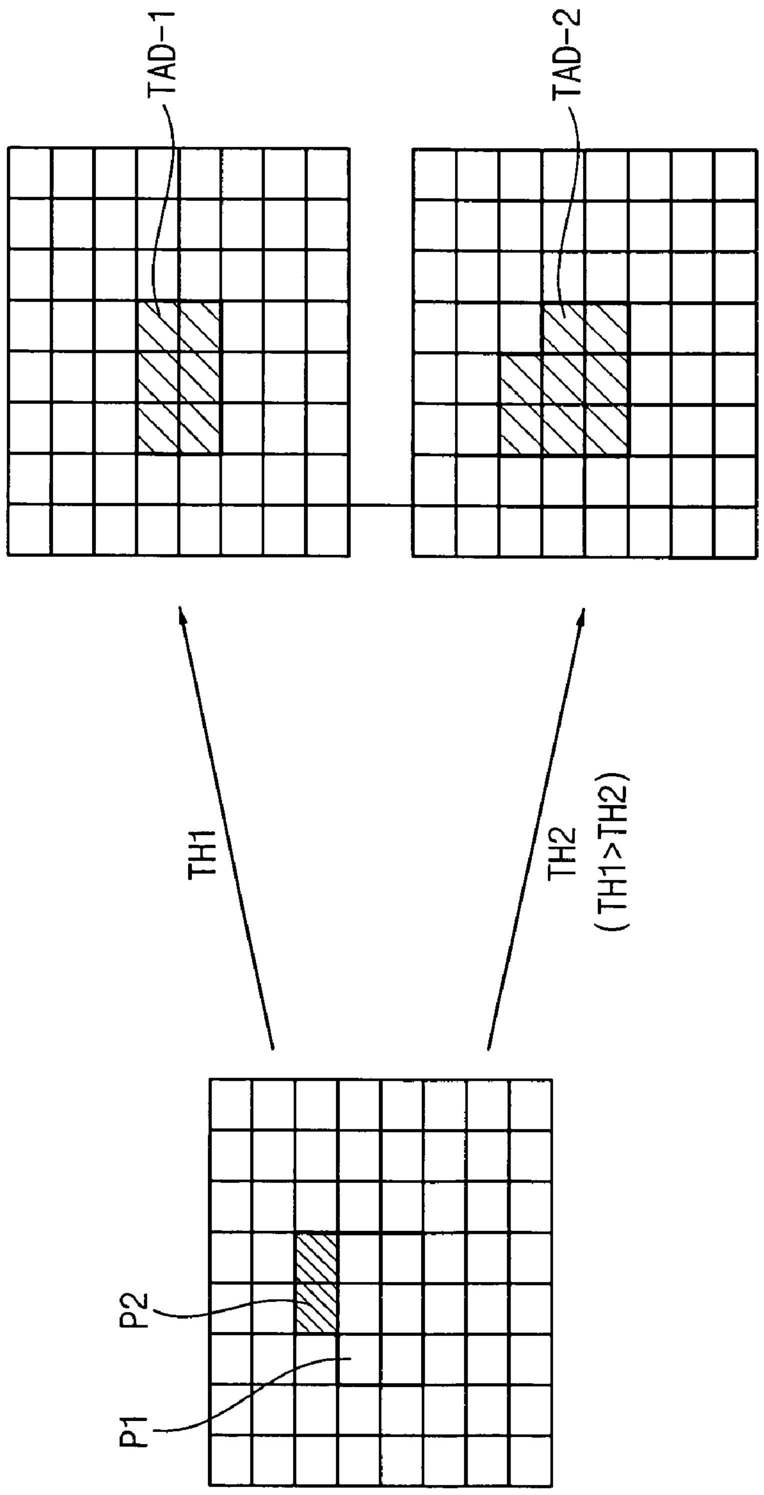
Figure 7D:
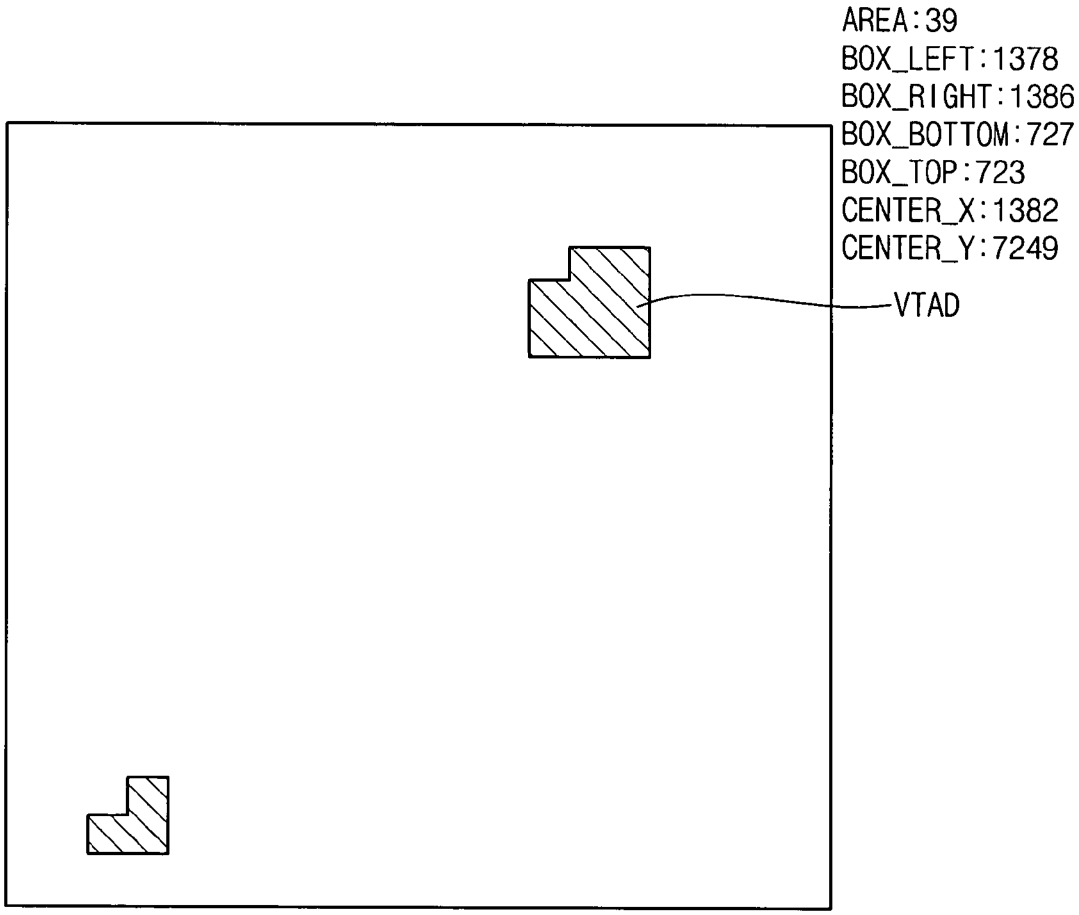

FIGS. 7A to 7D are conceptual views illustrating an operation of the valid first active area defect detecting section in FIG. 4. FIGS. 7A to 7C are conceptual views illustrating the PSM method. FIG. 7D is a conceptual view illustrating the blob analysis method.

Referring to FIGS. 7A to 7B, S(x,y) with respect to G(x,y) may be determined in an embodiment of the invention as $$\begin{aligned} S(x1, y1) &= \text{Max}\,[\text{Min}(G(x1, y1) - G(x1 - kn, y1), G(x1, y1) - G(x1 + kn, y1)), \text{Min}(G(x1, y1) - G(x1, y1 - kn), G(x1, y1) - G(x1, y1 + kn))] \\ &= \text{Max}\,[\text{Min}(400 - 400, 400 - 400), \text{Min}(400 - 400, 400 - 400)] \\ &= \text{Max}(0, 0) = 0. \end{aligned}$$

In an embodiment of the invention, when a gray level of a standard pixel (x1,y1) is substantially identical to those of neighboring pixels neighboring with the standard pixel (x1, y1), a singularity S(x1,y1) may be about zero. When the singularity S(x1,y1) of the standard pixel (x1,y1) is about zero, the standard pixel may not be an error pixel that has the valid first active area defect.

When the gray level of the standard pixel (x3,y3) is substantially larger than those of the pixels neighboring with the standard pixel, the singularity S(x3,y3) of the standard pixel (x3,y3) may be determined as $$\begin{aligned} S(x3, y3) &= \text{Max}\,[\text{Min}(G(x3, y3) - G(x3 - kn, y3), G(x3, y3) - G(x3 + kn, y3)), \text{Min}(G(x3, y3) - G(x3, y3 - kn), G(x3, y3) - G(x3, y3 + kn))] \\ &= \text{Max}\,[\text{Min}(400, 400), \text{Min}(400, 400)] \\ &= \text{Max}(400, 400) \\ &= 400, \end{aligned}$$

where the difference in a gray level between the standard pixel (x3,y3) and the neighboring pixels is about four hundred, for example.

When the gray level of the standard pixel (x4,y4) is substantially smaller than those of the pixels neighboring with the standard pixel (x4,y4), the singularity S(x4,y4) of the standard pixel (x4,y4) may be determined as $$\begin{aligned} S(x4, y4) &= \text{Max}\,[\text{Min}(G(x4, y4) - G(x4 - kn, y4), G(x4, y4) - G(x4 + kn, y4)), \text{Min}(G(x4, y4) - G(x4, y4 - kn), G(x4, y4) - G(x4, y4 + kn))] \\ &= \text{Max}\,[\text{Min}(300, 300), \text{Min}(300, 300)] \\ &= \text{Max}(300, 300) \\ &= 300, \end{aligned}$$

where the gray level of the standard pixel (x4,y4) is about zero, and where the difference in gray level between the standard pixel (x4,y4) and the neighboring pixels is about three hundred, for example.

When a gray level of a standard pixel is substantially smaller or larger than those of pixels neighboring with the standard pixel, a singularity S may be greater than zero. When the singularity S is greater than zero, the standard pixel has a possibility of being classified as the error pixel having the valid first active area defect.

The second active area defect deleting section 223 provides the valid first active area defect detecting section 225 with the third active area image data AIM3 associated with the first active area defect FAD. The valid first active area defect detecting section 225 then converts the third active area image data AIM3 into a PSM image data to detect the valid first active area defect VFAD.

Referring to FIGS. 7C and 7D, the PSM image data is analyzed by the binary method and the blob analysis method. Thus, the valid first active area defect VFAD of the first active area defect FAD may be detected. For example, a position of the valid first active area defect VFAD may be detected.

The PSM image data expresses error pixels having the valid first active area defects as the singularities S being over zero.

The singularities S are converted into "1" or "0" by the binary method.

As illustrated in FIG. 7C, the error pixels may be managed as a first group and a second group by the blob analysis method. The first error pixel group and the second error pixel group include first error pixels P1 and second error pixels P2, respectively.

Either the first error pixel group or the second error pixel group may be classified as the valid first active area defects VFAD in accordance with a threshold.

As one example, when the first error pixels P1 and the second error pixels P2 are respectively converted into “1” and “0” by the binary method using a first threshold TH1, the first error pixel group may be classified as a first valid first active area defect VFAD1.

As another example, when the first error pixels P1 and the second error pixels P2 are respectively converted into “0” and “1” by the binary method using a second threshold TH2, the second error pixel group may be classified as a second valid first active area defect VTAD2. Here, the second threshold TH2 may be different from the first threshold TH1. The second threshold TH2 may be substantially larger than the first threshold TH1.

As illustrated in FIG. 7D, coordinates associated with an area and a position of the valid first active area defect VTAD are detected. For example, the coordinates of the valid first active area defect VFAD include an area coordinate, a box left coordinate, a box right coordinate, a box top coordinate, a box bottom coordinate, a box center X coordinate and a box center Y coordinate. The area coordinate, the box left coordinate, the box right coordinate, the box top coordinate, the box bottom coordinate, the box center X coordinate and the box center Y coordinate are about 39, 1378, 1386, 723, 727, 1382 and 7249, respectively.

When the valid first active area defect VFAD is generated at the data line or the gate line, the valid first active area defect VFAD may have a straight line shape extending in the X-axis direction or the Y-axis direction. Hereinafter, the valid first active area defect VFAD generated at the data line or the gate line is referred as a line valid first active area defect L-VFAD.

When the valid first active area defect VFAD is generated at the optical film, the valid first active area defect VFAD may have a dot shape or a line of curvature shape.

FIGS. 8A to 8D are conceptual views illustrating the line valid first active area defect.

Figure 8A:
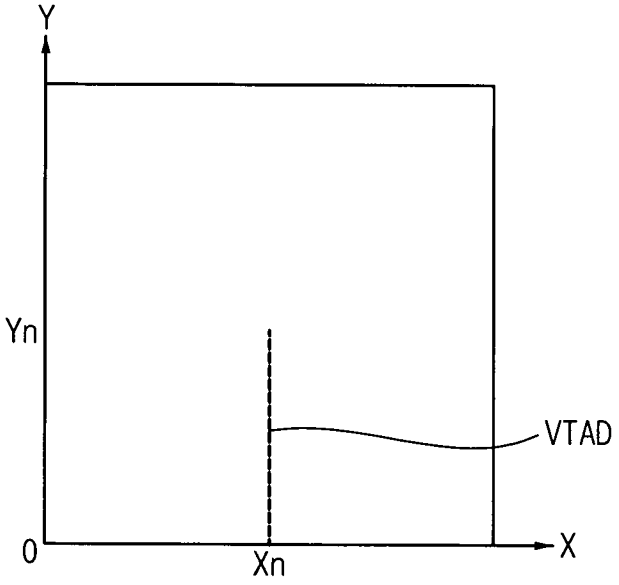
FIGS. 8A to 8D are conceptual views illustrating the line valid first active area defect.
Figure 8B:
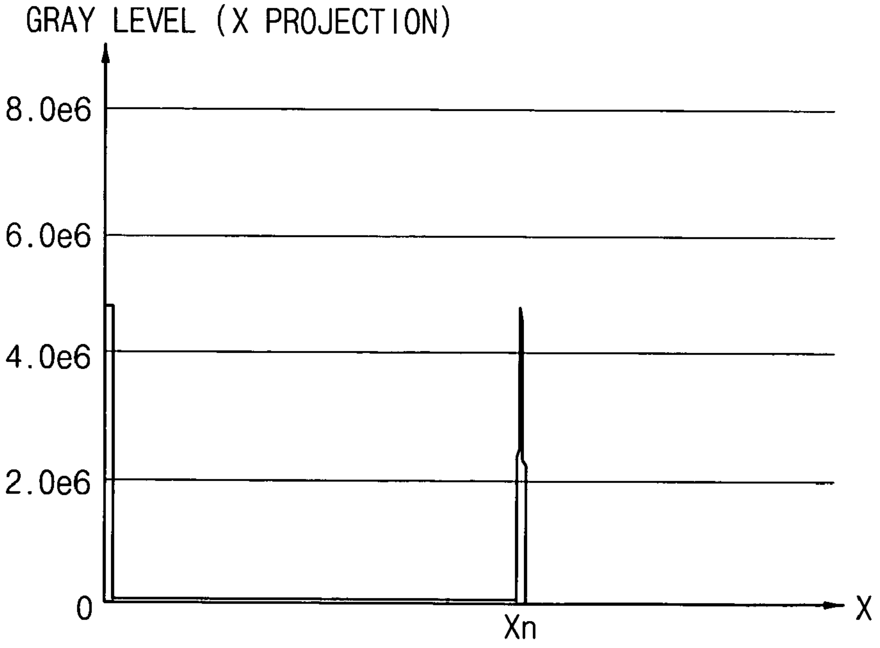

FIG. 8A is a graph illustrating an active area image data of the line valid first active area defect L-VFAD obtained by the PSM method, the binary method and the blob analysis method. FIG. 8B is a graph illustrating an X-axis projection of the active area image data in FIG. 8A. A position of a line having the line valid first active area defect L-VFAD may be detected using the X-axis projection. An X coordinate of the line having the line valid first active area defect may be Xn, because the X-axis projection peaks at Xn.

Figure 8C:
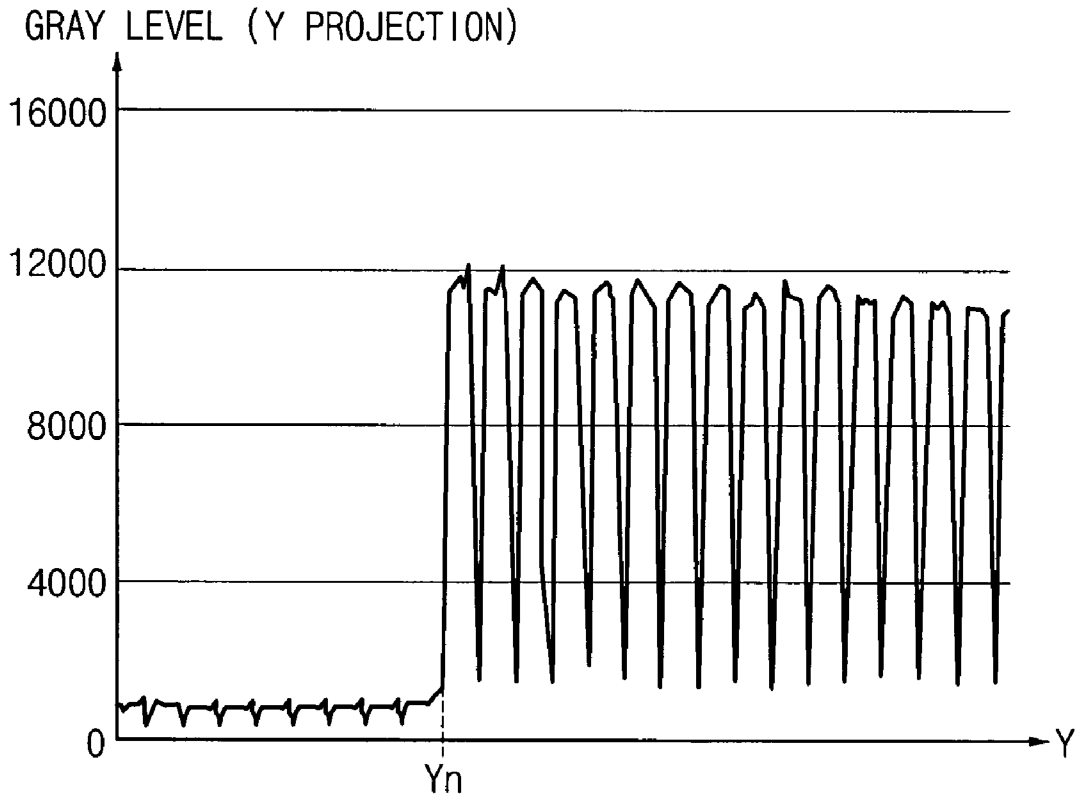

FIG. 8C is a graph illustrating a Y-axis projection of the active area image data of FIG. 8A. The graph in FIG. 8C also shows the line valid first active area defect L-VFAD generated at the line. As illustrated in FIG. 8C, when a Y coordinate is less than Yn, the gray level is about zero. When the Y coordinate is no less than Yn, the gray level is constantly maintained greater than zero, because an open is generated at a point (Xn,Yn) of the line.

Figure 8D:
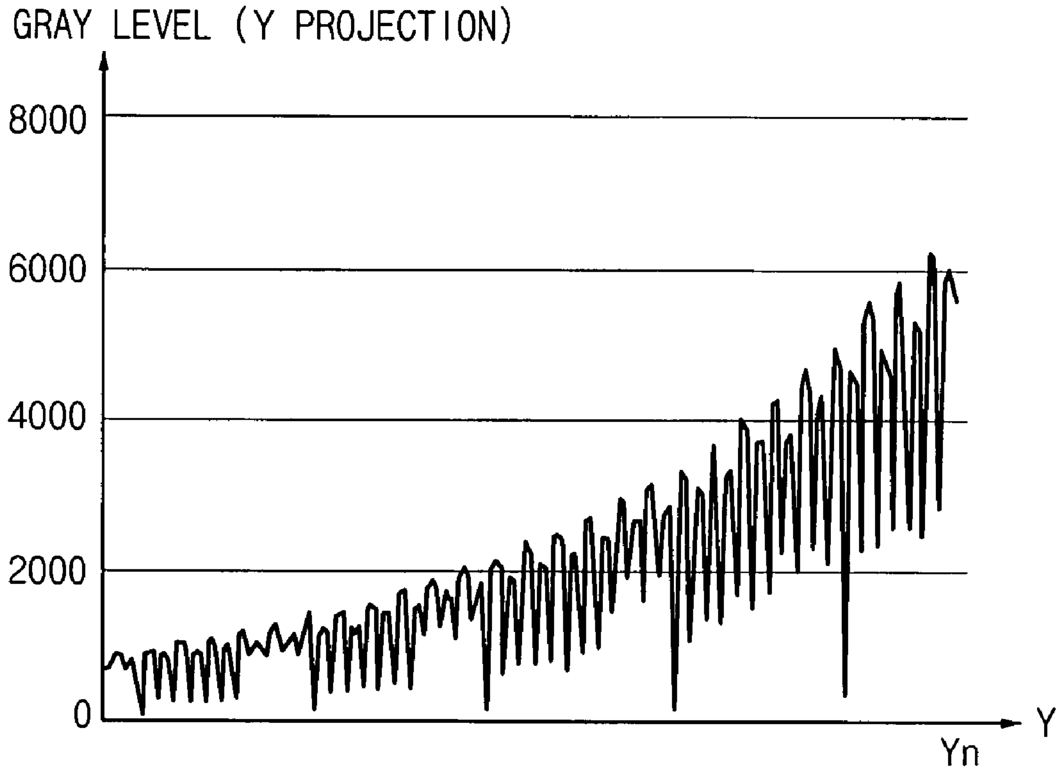

FIG. 8D is a graph illustrating a Y-axis projection showing a line valid first active area defect due to a short. In FIG. 8D, a substantially maximum gray level corresponding to Yn is illustrated. When a Y coordinate decreases from Yn, the gray level also decreases, because a short is generated at a point (Xn,Yn) at which a gate line meets a data line. A type of the line valid first active area defect L-VFAD as well as the position of the line valid first active area defect L-VFAD may be detected.

As described above, the active area defect inspecting section 220 detects the valid first active area defect VFAD of the pixels, the gate lines, the data lines and the optical film using the active area image data provided from the first image pickup section 120. In order to detect the valid first active area defect VFAD, the active area is determined. The second active area defect is then deleted. The valid first active area defect VFAD and the position of the valid first active area defect VFAD may be detected using the PSM method, the binary method and the blob analysis method.

An inspection result concerning the valid first active area defect VFAD detected by the active area defect inspecting section 220 is stored in the storage section 240. The control section 260 manages the inspection result.

Figure 9A:
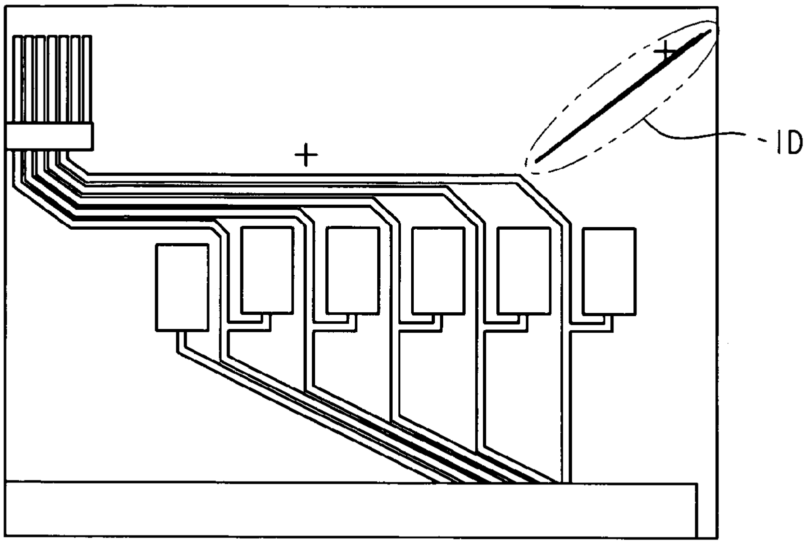
FIGS. 9A to 9C are conceptual views illustrating an operation of the inactive area defect inspecting section of FIG. 4.
Figure 9B:
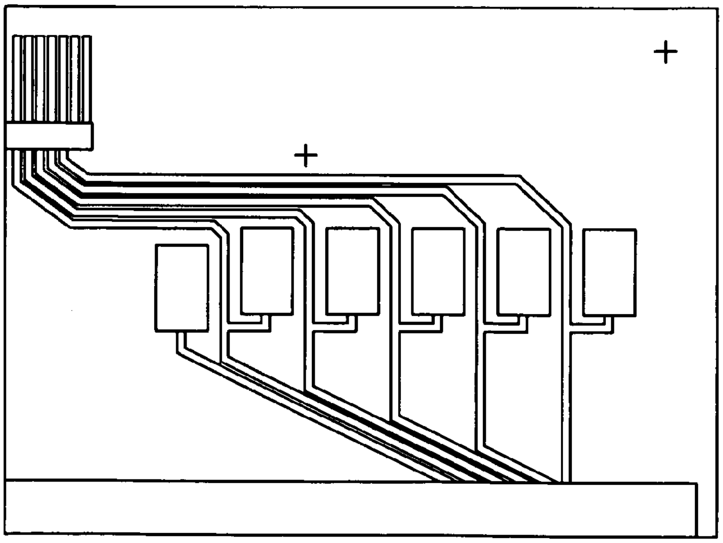
Figure 9C:
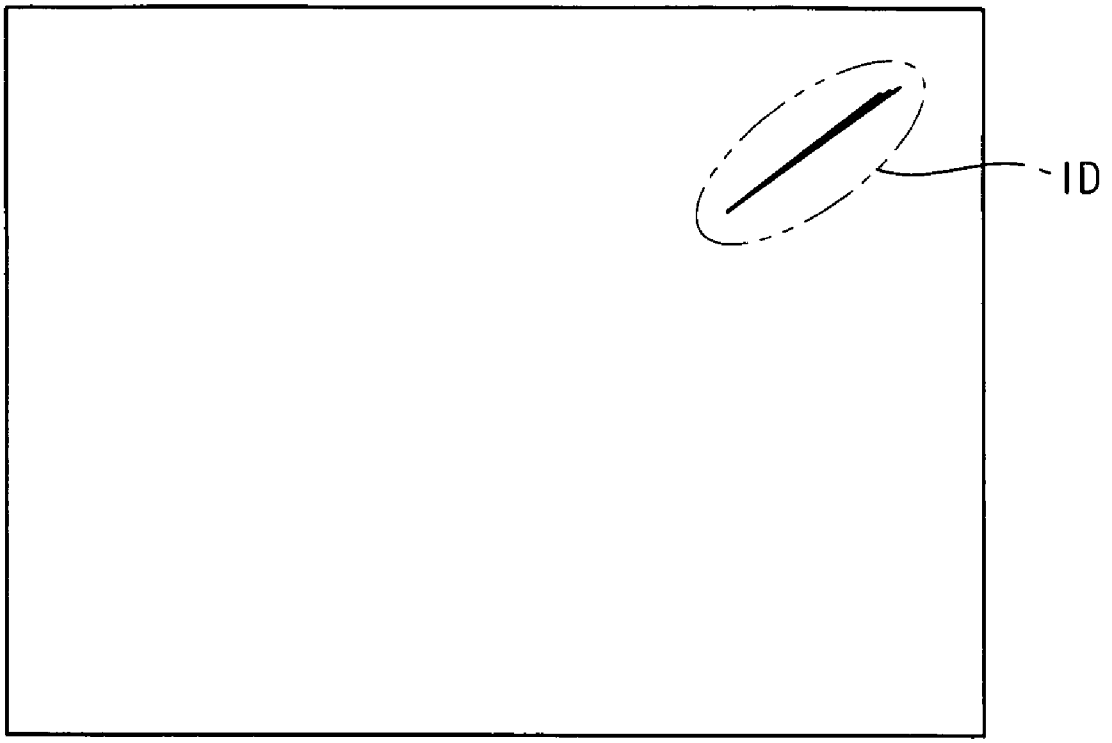
Figure 10:
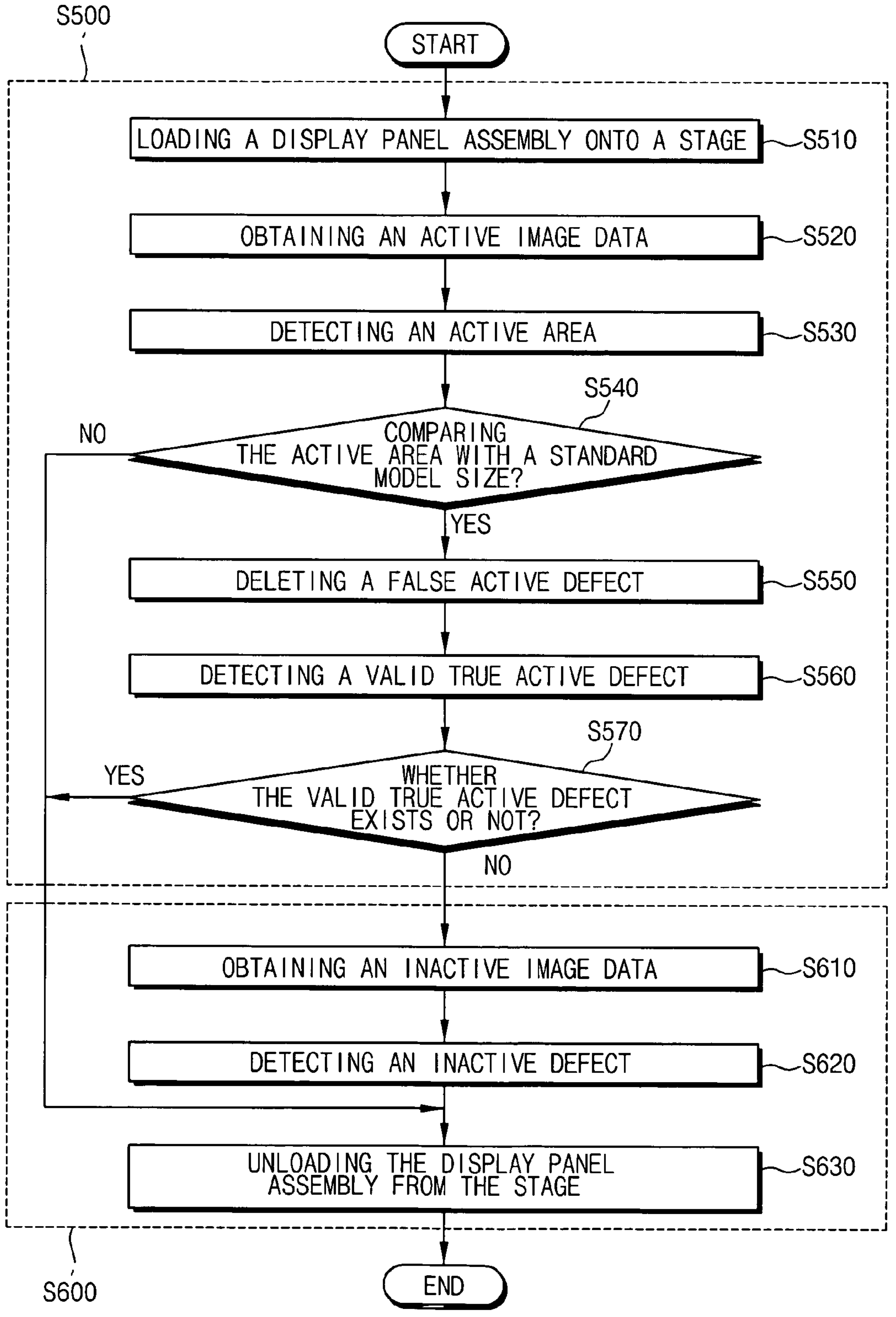
FIGS. 10 to 16 are flow charts illustrating a method of testing a display panel assembly, according to an exemplary embodiment of the present invention.

FIGS. 9A to 9C are conceptual views illustrating an operation of the inactive area defect inspecting section of FIG. 4. The operation of the inactive area defect inspecting section will be described with reference to FIGS. 3 and 4.

To obtain an inactive area image data, the system control section 200 turns on the backlight portion 431. The backlight portion 431 is received in the stage positioned at a third portion 430 of the test system. The third portion 430 corresponds to the second camera 131. When the backlight portion 431 is turned on, the second camera 131 picks up the inactive area image displayed on the display panel assembly 101. The inactive area image may concern the PCB. The second signal processing section 133 converts a signal of the inactive area image into an inactive area image data. The first signal processing section 133 then provides the system control section 200 with the inactive area image data.

FIG. 9A is a view illustrating the inactive area image data obtained by the second image pickup section. FIG. 9B is a view illustrating a reference image data of a reference display panel assembly that may not have the inactive area defect. The second image pickup section 130 provides the inactive area defect inspection section 230 with the inactive area image data IIM. The inactive area defect detecting section 233 may detect the inactive area defect by comparing the inactive area image data IIM with the reference image data RIM stored in the reference data storing. The reference image data RIM is deleted from the inactive area image data IIM so that the inactive area defect ID may be efficiently detected. When the inactive area image data IIM includes the inactive area defect ID, a subtraction image data formed by subtracting the reference image data RIM from the inactive area image data IIM also includes the inactive area defect ID.

The control section 260 controls the storage section 240 to store an inactive area defect data associated with the inactive area defect ID detected by the inactive area defect inspecting section 230. The control section 260 manages data results from both the valid first active area defect inspecting section 220 and the inactive area defect detecting section 230.

FIGS. 10 to 16 are flow charts illustrating a method of testing a display panel assembly, according to an exemplary embodiment of the present invention. The method of testing the display panel assembly uses the test system, described above. The method of testing the display panel assembly includes an active area defect detecting step S500 and an inactive area defect detecting step S600.

Referring to FIGS. 1 to 4 and 10, in step S510, the loading arm 471 carries the display panel assembly 101 from the loading cassette 461 to the stage positioned at the first portion 410 of the test system. The first portion corresponds to the OCR section 110. The OCR section 110 recognizes the unique number of the display panel assembly 101. The OCR section 110 provides the control section 260 with the unique number. The control section 260 manages an inspection data concerning the display panel assembly 101 using the unique number provided from the OCR section 110.

In step S520, the control section 260 controls the instrument section and the first image pickup section 120 to obtain the active area image data.

Figure 11:
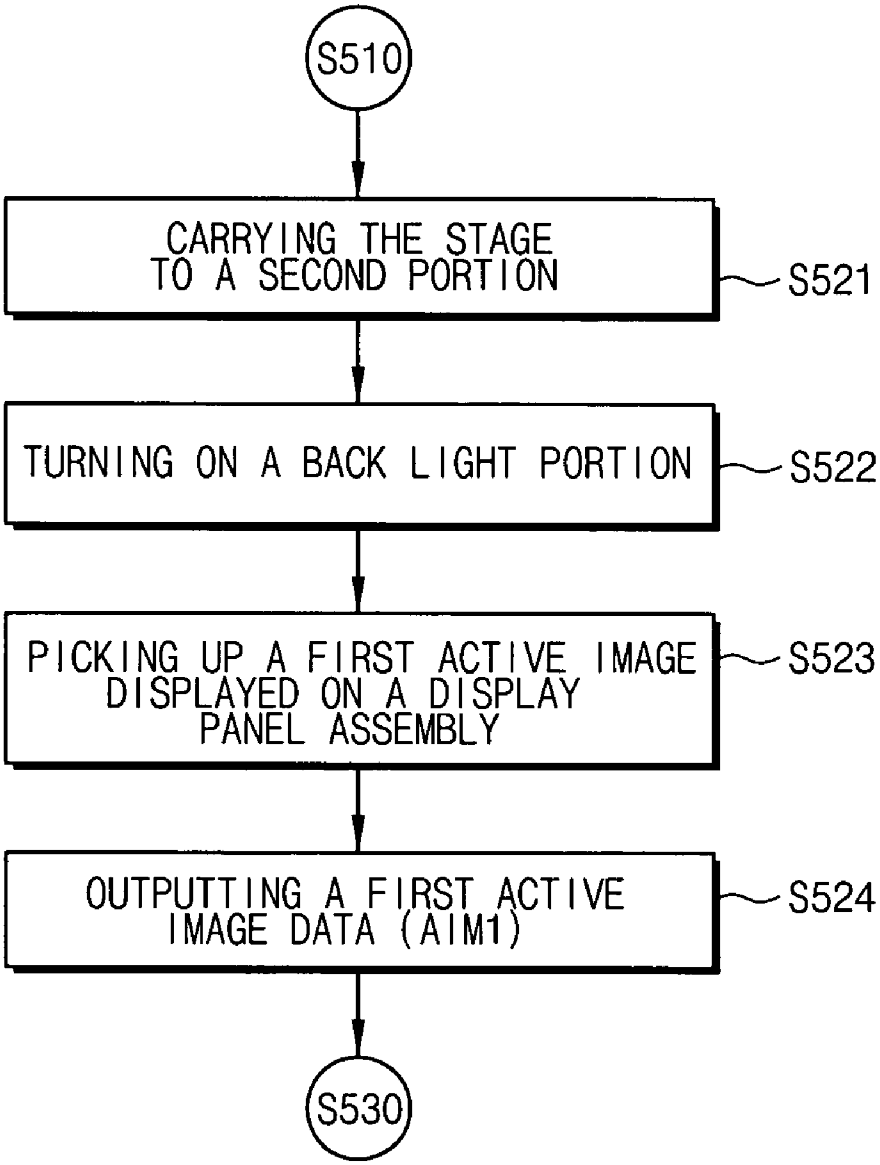

As illustrated in FIG. 11, in step S521, the control section 260 controls the rotatable driving section 4111 to carry the stage to the second portion 420 of the test system. The second portion corresponds to the active area image pickup section 120.

In step S522, the control section 260 turns on the backlight portion 421. In addition, the control section 260 turns off the test signal generating section 424. Thus, an electrical field may not be applied to the display panel assembly 101.

In step S523, the control section 260 drives the first camera 121 to pick up the first active area image displayed on the display panel assembly 101.

In step S524, the first signal processing section 123 converts a signal of the first active area image into the first active area image data. The active area defect inspecting section 220 is provided with the first active area image data.

In step S530, the active area determining section 211 is provided with the first active area image data. The active area determining section 211 then determines the active area.

Figure 12:
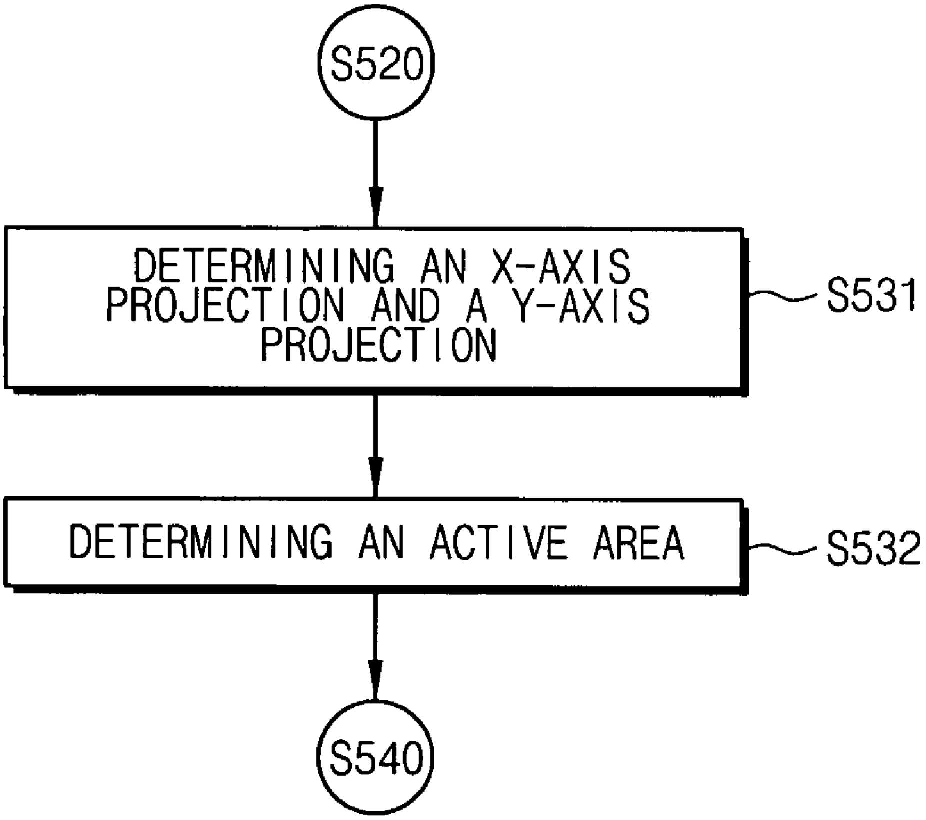

As illustrated in FIG. 12, in step S531, the X-axis projection and the Y-axis projection of the first active area image data are determined. In step S532, the active area of the first image data IM is determined using the X-axis projection and the Y-axis projection.

In step S540, the control section 250 compares the active area of the first active area image data with a standard model size of the display panel assembly 101 so that a difference in size between the active area and the standard model size is determined. When the difference is substantially large, the control section 260 controls the output section 250 to display an image concerning the difference. Detections of the active area defect and the inactive area defect may then be stopped.

In step S550, when the active area of the first image data is substantially identical to the standard model size, the active area defect detecting step may proceed. A second active area defect is deleted.

Figure 13:
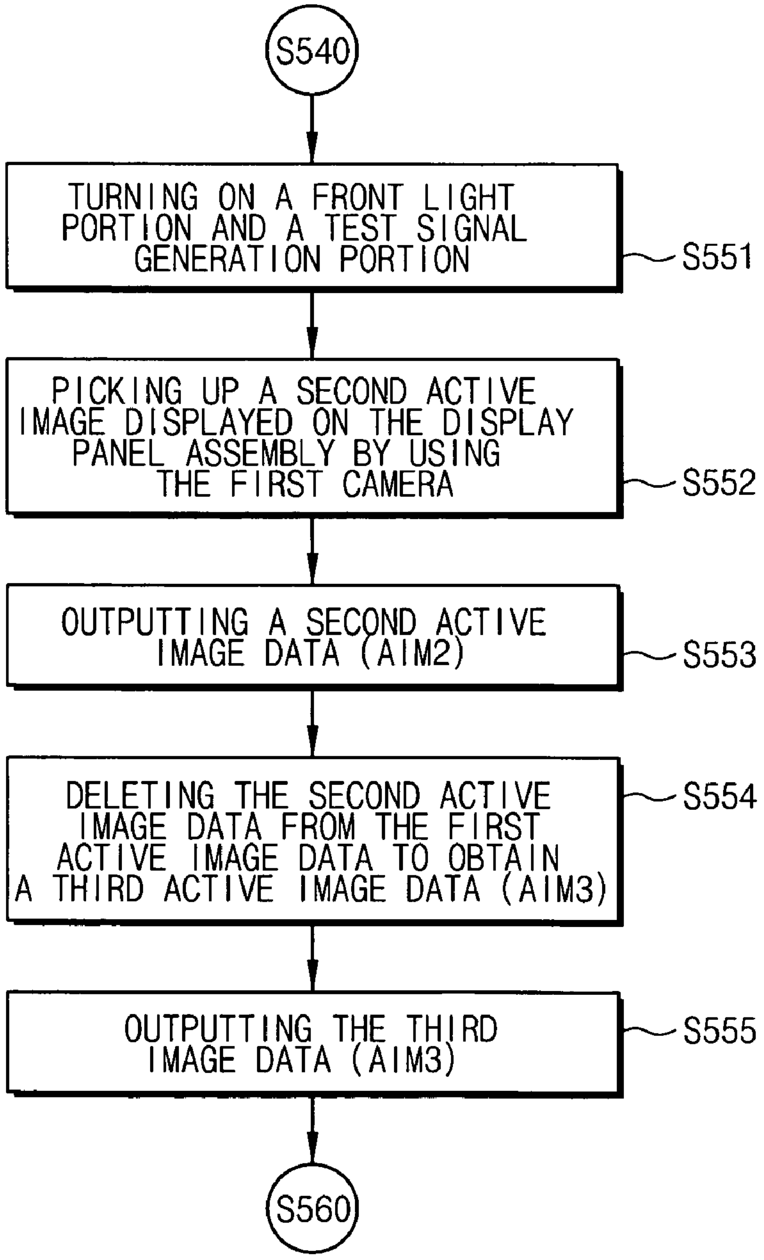

As illustrated in FIG. 13, in step S551, the control section 260 turns on the backlight portion 421. The control section 260 turns on the test signal generating section 424.

In step S552, the first camera 121 operates to pick up the second image displayed on the display panel assembly 101 using a light provided from the backlight portion 421.

In step S553, the first signal processing section 123 converts a signal of the second active area image into the second active area image data AIM2.

In step S554, the second active area image data AIM2 is deleted from the first active area image data AIM1 so that a third active area image data AIM3 is obtained.

In step S555, the third active area image data AIM3 is outputted. The first active area image data AIM1 has the first active area defect and the second active area defect. The second active area image data AIM2 has the second active area defect alone. Thus, the third active area image data AIM3 may have the first active area defect alone.

In step S560, the valid first active area defect detecting section 225 detects the first active area defect using the third active area image data AIM3. For example, the valid first active area defect detecting section 225 detects a position of the first active area defect using the third active area image data AIM3.

Figure 14:
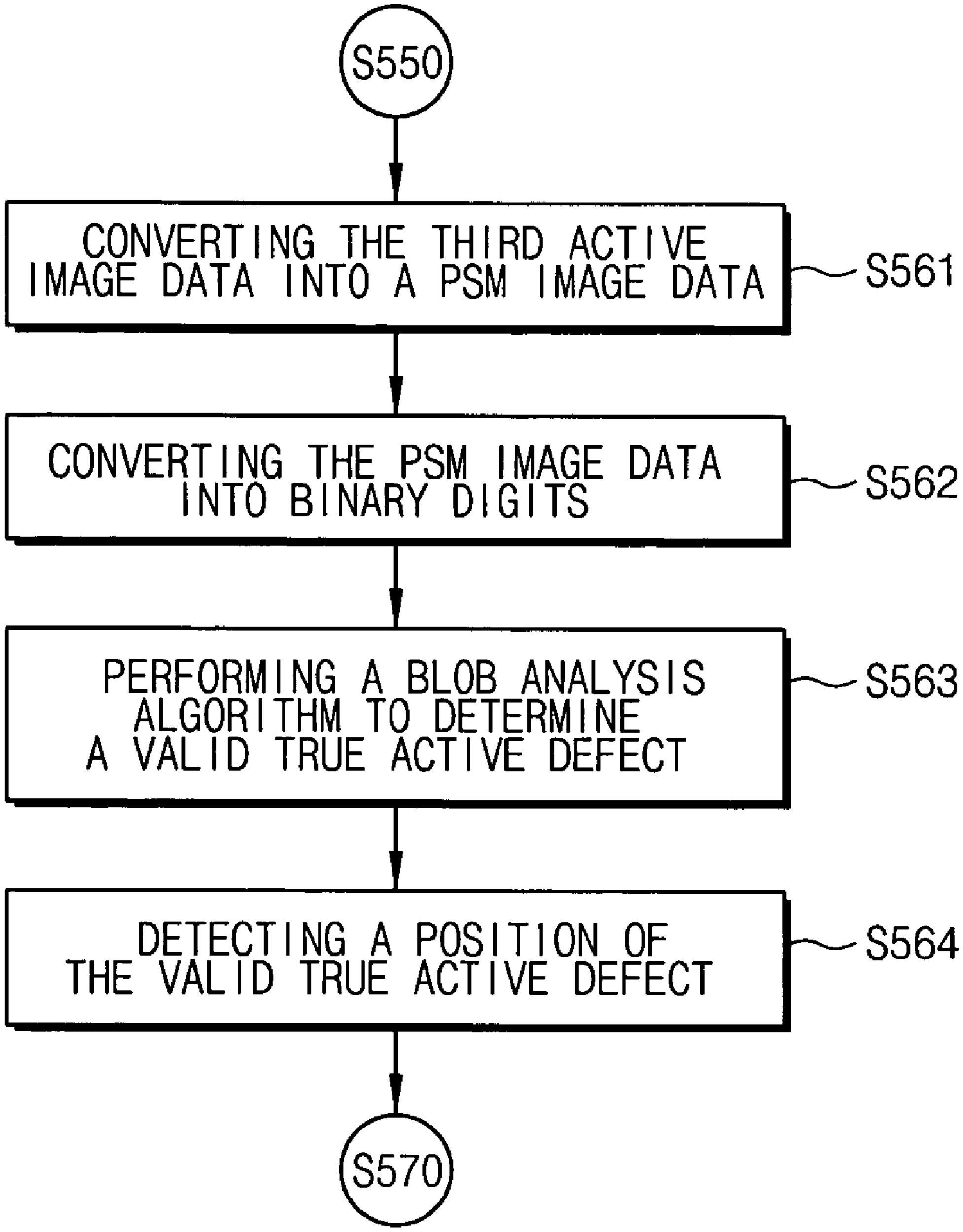

As illustrated in FIG. 14, in step S561, the third active area image data AIM3 is converted into the PSM image data using the PSM method.

In step S562, the PSM image data is converted into binary digits to detect the error pixels.

In step S563, the error pixels are managed as a group using a blob analysis method so that valid first active area defect is determined.

In step S564, a position of the valid first active area defect is determined. When the valid first active area defect is a line valid first active area defect, a type of the line valid first active area defect is determined. The type may be a line open or a line short. The type may be determined using the X-axis projection and the Y-axis projection.

In step S570, the control section 260 determines whether the valid first active area defect detecting section 225 detects the first active area defect or not. When the first active area defect is detected by the first active area defect detecting section 225, an inactive area defect detecting process may not proceed.

When the valid first active area defect is detected, the control section 260 controls the output section 250. The output section then displays an image concerning the valid first active area defect. In addition, the inactive area defect inspecting step may not proceed.

In step S620, when the valid first active area defect is not detected by the valid first active area defect detecting section 225, the inactive area defect detecting process may proceed.

Figure 15:
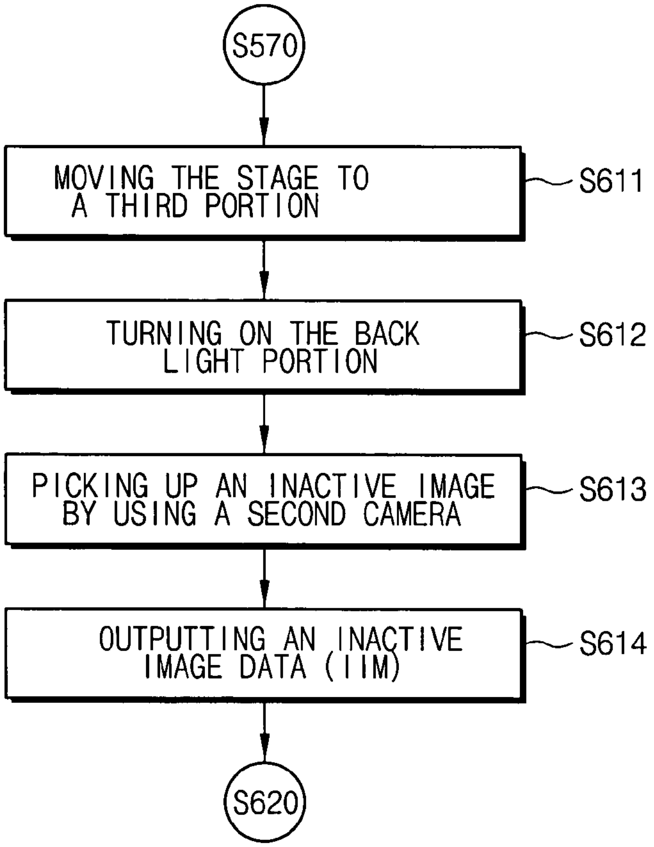

As illustrated in FIG. 15, in step S611, the control section 260 controls the turntable driving section 4111. Thus, the display panel assembly 101 is moved to a third portion 430 of the test system. The third portion corresponds to the second image pickup section 130.

In step S612, the control section 260 turns on the backlight portion 431 of the stage positioned at the third portion 430.

In step S613, the control section 260 drives the second camera 131 so that the second camera 131 may pick up an inactive area image displayed on the display assembly 101.

In step S614, the second signal processing section 133 converts a signal of the inactive area image into the inactive area image data IIM. The invalid first active area defect detecting section 230 is provided with the inactive area image data IIM.

Figure 16:
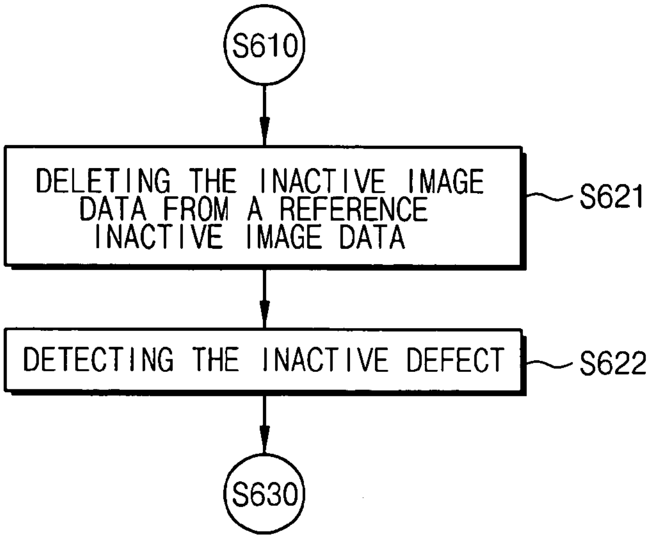

As illustrated in FIG. 16, in step S621, the inactive area defect detecting section 233 of the inactive area defect inspecting section 230 compares the inactive area image data IIM with the reference inactive area image data RIM so that a difference between the inactive area image data IIM and the reference inactive area image data RIM is determined. In step S622, the inactive area defect is detected using the difference.

When the active area defect inspection process and the inactive area defect inspection process are finished, the control section 260 moves the display panel assembly 101 to a fourth portion 440.

Sequentially, the control section 260 controls the arm driving section 4701 to move the display panel assembly 101 from the stage to the unloading cassette 462.

Thus, the display panel assembly 101 may be received in the unloading cassette 462. The unloading cassette 462 is then laid in an X-axis direction.

According to the present invention, a visual inspection process may be performed automatically. Thus, defects in display devices may be rapidly detected. The time required for detecting the defects is minimized and yield of the display device may be increased. In addition, personnel expenses are saved. Furthermore, the defects may be accurately detected and display quality of the display device may be increased.

Although the exemplary embodiments of the present invention have been described in detail with reference to the accompanying drawings for the purpose of illustration, it is to be understood that the inventive processes and apparatus are not to be construed as limited thereby. It will be readily apparent to those of reasonable skill in the art that various modifications to the foregoing exemplary embodiments may be made without departing from the scope of the invention as defined by the appended claims, with equivalents of the claims to be included therein.

What is claimed is:

1. A test system comprising:

a rotatable turntable including a plurality of stages;

a loading section loading a display panel assembly onto the stages, the loading section recognizing a unique number of the display panel assembly;

a first image pickup section picking up first and second active area image displayed on the display panel assembly, the first image pickup section obtaining first and second active area image data from the first and second active area images;

a second image pickup section picking up an inactive area image displayed on the display panel assembly, the second image pickup section obtaining an inactive area image data from the inactive area image;

a system control section detecting a valid first active area defect by comparing the first and second active area image data with each other, the system control section detecting an inactive area defect by comparing the inactive area image data with a reference inactive area image data; and an unloading section unloading the display panel assembly from the stage.

2. The test system of claim 1, further comprising:

a loading cassette receiving the display panel assemblies to be loaded onto the stage; and an unloading cassette receiving the display panel assemblies unloaded from the stage.

3. The test system of claim 1, wherein the first image pickup section comprises:

a first camera picking up the first and second active area images displayed on the display panel assembly; and a first signal processing section converting a signal of the first and second active area images into the first and second active area image data.

4. The test system of claim 1, wherein the second image pickup section comprises:

a second camera picking up the inactive area image displayed on the display panel assembly; and a second signal processing section converting a signal of the inactive area image signal into the inactive area image data.

5. The test system of claim 1, wherein each of the stages comprises:

a backlight portion providing a light to a first side of the display panel assembly;

a support member disposed over the backlight portion, the support member supporting the display panel assembly;

a front light portion providing a light to a second side of the display panel assembly; and a signal generating portion applying an electrical signal to the display panel assembly.

6. The test system of claim 5, wherein the system control section controls the stage to at least one of electrically drive the display panel assembly or optically drive the display panel assembly.

7. The test system of claim 1, wherein the system control section comprises:

an active area defect inspecting section examining a display quality;

an inactive area defect inspecting section examining an appearance of the display panel assembly; and a controller controlling the system control section, the active area defect inspecting section and the inactive area defect inspecting section.

8. The test system of claim 7, wherein the active area defect inspecting section comprises:

an active area determining section determining an X-axis projection and a Y-axis projection of the first active area image data to determine an active area of the display panel assembly;

a second active area defect deleting section deleting a second active area defect from active area defects of the first active area image data; and a valid first defect detecting section detecting a valid first defect of the first active area image data after the second defect is deleted from the first active area image data.

9. The test system of claim 8, wherein when a size of the active area determined by the active area determining section is different from a size of an actual active area of the display panel assembly by a predetermined value, the controller stops operations of the active area defect inspecting section and the inactive area defect inspecting section.

10. The test system of claim 8, wherein when the valid defect is detected from the first active area image data after the second defect is deleted from the first active area image data, the controller stops an operation of the inactive area defect inspection section.

11. The test system of claim 7, wherein the inactive area defect inspecting section comprises:

a reference data storing section storing the reference inactive area image data obtained from a reference display panel assembly being substantially free of the inactive area defect; and an inactive area defect detecting section comparing the reference inactive area image data with the inactive area image data to detect the inactive area defect.

12. The test system of claim 8, wherein the active area determining section determines the active area using the first active area image data obtained from the first active area image generated using the backlight portion in a state free of an electrical field.

13. The test system of claim 8, wherein the second defect deleting section deletes the second defect based on a difference between the first active area image data and the second active area image data, wherein the first active area image data is obtained from the first active area image generated using the backlight portion in a state of an electrical field, and wherein the second active area image data is obtained from the second active area image generated using the front light portion in a state substantially free of the electrical field.

14. The test system of claim 8, wherein the valid first active area defect detecting section determines the valid first active area defect using a pixel singularity measurement method, a binary method and a blob analysis method, wherein the pixel singularity measurement method determines a singularity of a standard pixel using differences in a gray level between the standard pixel and neighboring pixels that neighbor with the standard pixel, wherein the binary method converts the singularity into binary digits of “1” or “0”, and wherein the blob analysis method manages pixels having an identical binary digit as a group to detect the valid first active area defect.

15. The test system of claim 14, wherein the singularity S(x,y) is determined as $$S(x,y)=\mathrm{Max}[\mathrm{Min}(G(x,y)-G(x-kn,y),G(x,y)-G(x+kn,y)),\mathrm{Min}(G(x,y)-G(x,y-kn),G(x,y)-G(x,y+kn))],$$

wherein G(x,y) is a gray level of a pixel (x,y) and "k" and "n" are natural numbers.

16. The test system of claim 11, wherein the inactive area image data is obtained by the inactive area image generated using the backlight portion in a state substantially free of an electrical field.

17. A method of testing a display panel assembly comprising:

recognizing a unique number of the display panel assembly loaded onto a stage positioned on a turntable;

detecting a valid first active area defect by comparing first and second active area image data obtained from first and second active area image displayed on the display panel assembly;

detecting an inactive area defect by comparing inactive area image data with a reference inactive area image data, the inactive area image data being obtained from an inactive area image displayed on the display panel assembly; and unloading the display panel assembly from the stage.

18. The method of claim 17, wherein detecting the valid first active area defect comprises:

detecting an active area of the display panel assembly using the first active area image data;

deleting a second active area defect from the first active area image data; and detecting a valid first active area defect of the first active area image data after the second active area defect is deleted from the first active area image data.

19. The method of claim 17, wherein detecting the valid first active area defect comprises:

comparing the active area with an actual active area; and when a size of the active area is different from a size of the actual active area by a predetermined value, stopping an active area defect inspecting process and an inactive area defect inspecting process.

20. The method of claim 18, further comprising when the valid first active area defect is detected, stopping an active area defect inspecting process and an inactive area defect inspecting process.

21. The method of claim 18, wherein detecting the active area comprises:

picking up the first active area image displayed on the display panel assembly using a backlight portion in a state substantially free of an electrical field;

converting the first image into the first active area image data;

determining an X-axis projection and a Y-axis projection using the first image data; and determining the active area of the display panel assembly using the X-axis projection and the Y-axis projection.

22. The method of claim 21, wherein the step of deleting the second active area defect comprises:

when a test voltage is applied to the display panel assembly, picking up the first active area image displayed on the display panel assembly using a backlight portion;

converting the first active area image into the first active area image data;

when the test voltage is not applied to the display panel assembly, picking up the second active area image displayed on the display assembly using a front light portion;

converting the second active area image into the second active area image data; and deleting the second active area defect by excluding the second active area image data from the first active area image data.

23. The method of claim 18, wherein the step of detecting the valid first active area defect comprises:

determining a singularity of a standard pixel using differences in a gray level between the standard pixel and neighboring pixels that neighbor with the standard pixel;

converting the singularity into binary digits of "1" or "0"; and managing pixels having an identical binary digit as a group to detect the valid first active area defect.

24. The method of claim 17, wherein detecting the inactive area defect comprising:

picking up an inactive area image displayed on the display panel assembly using a backlight portion in a state substantially free of an electrical field;

converting a signal of the inactive area image into an inactive area image data; and detecting the inactive area defect using a difference between the inactive area image data and the reference inactive area image data.

* * * * *